(12) United States Patent
Amer et al.

(10) Patent No.: US 12,388,718 B2
(45) Date of Patent: *Aug. 12, 2025

(54) PREDICTING A LIKELIHOOD OF A PREDETERMINED ACTION ASSOCIATED WITH A MOBILE DEVICE

(71) Applicant: T-Mobile USA, Inc., Bellevue, WA (US)

(72) Inventors: Mohamed Abdullah Amer, Naperville, IL (US); Michael Monroe Carley, Sammamish, WA (US); Shangyu Ni, Bellevue, WA (US); Anupriya Thirumurthy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 481 days.

This patent is subject to a terminal disclaimer.

(21) Appl. No.: 18/050,356

(22) Filed: Oct. 27, 2022

(65) Prior Publication Data
US 2024/0146616 A1    May 2, 2024

Related U.S. Application Data

(60) Provisional application No. 63/419,629, filed on Oct. 26, 2022.

(51) Int. Cl.
*H04W 24/08* (2009.01)
*H04L 41/06* (2022.01)
(Continued)

(52) U.S. Cl.
CPC ............ *H04L 41/147* (2013.01); *H04L 41/06* (2013.01); *H04L 41/5009* (2013.01);
(Continued)

(58) Field of Classification Search
CPC ..... H04W 24/04; H04W 24/08; H04W 48/02; H04W 64/00; H04L 41/06; H04L 41/147; H04L 41/5009
(Continued)

(56) References Cited

U.S. PATENT DOCUMENTS 7,181,227 B2    2/2007  Wilson et al.
8,660,579 B2    2/2014  Voyer et al.
(Continued)

FOREIGN PATENT DOCUMENTS

CN    101151915 B    3/2013
CN    101904203 B    2/2014
(Continued)

OTHER PUBLICATIONS

Wangperawong, Artit , et al., "Churn analysis using deep convolutional neural networks and autoencoders" pp. 1-6.

*Primary Examiner* — Jean A Gelin
(74) *Attorney, Agent, or Firm* — Perkins Coie LLP

(57) ABSTRACT

The system obtains a recording of an interaction between a UE and a representative of a network. The system obtains a summary associated with the interaction, where the summary includes an indication of a topic representing a portion of the interaction, a time when the topic was present in the interaction, and a generator of the portion of the interaction associated with the topic. The system obtains multiple inputs associated with the multiple UEs and multiple representatives. The system provides the summary of the interaction and the multiple inputs to an AI configured to predict a likelihood of a predetermined action associated with the UE. The system receives from the AI the likelihood of the predetermined action. Based on the likelihood of the prede-
(Continued)

termined action, the system performs an action within a network prior to an occurrence of the predetermined action associated with the UE.

20 Claims, 15 Drawing Sheets

(51) Int. Cl.
    *H04L 41/147*     (2022.01)
    *H04L 41/5009*     (2022.01)
    *H04M 3/22*     (2006.01)
    *H04W 24/04*     (2009.01)
    *H04W 48/02*     (2009.01)
    *H04W 64/00*     (2009.01)

(52) U.S. Cl.
    CPC ......... *H04M 3/2281* (2013.01); *H04W 24/04* (2013.01); *H04W 24/08* (2013.01); *H04W 48/02* (2013.01); *H04W 64/00* (2013.01)

(58) Field of Classification Search
    USPC ....................................................... 455/414.1
    See application file for complete search history.

(56) References Cited

U.S. PATENT DOCUMENTS

| | | | |
|---|---|---|---|
| 8,744,443 | B2 | 6/2014 | Buckley et al. |
| 10,084,922 | B2 | 9/2018 | Soini et al. |
| 10,148,819 | B2 | 12/2018 | Yokel et al. |
| 10,181,326 | B2 * | 1/2019 | Raanani ............. H04M 3/5183 |
| 10,319,477 | B1 | 6/2019 | Bill |
| 10,679,013 | B2 | 6/2020 | Raanani et al. |
| 11,006,268 | B1 | 5/2021 | Kim et al. |
| 11,178,028 | B1 | 11/2021 | Maseedu |
| 11,297,513 | B2 | 4/2022 | Agarwal et al. |
| 11,337,096 | B2 | 5/2022 | Saluja et al. |
| 11,416,740 | B2 | 8/2022 | Nokbak Nyembe et al. |
| 2002/0097267 | A1 | 7/2002 | Dinan et al. |
| 2004/0192299 | A1 | 9/2004 | Wilson et al. |
| 2005/0143097 | A1 | 6/2005 | Wilson et al. |
| 2009/0129569 | A1 * | 5/2009 | Geldbach ............. H04W 88/10 455/507 |
| 2009/0253406 | A1 * | 10/2009 | Fitzgerald ........... H04W 12/082 455/410 |
| 2010/0026816 | A1 | 2/2010 | Bergstrom et al. |
| 2010/0029326 | A1 | 2/2010 | Temple et al. |
| 2011/0200022 | A1 | 8/2011 | Annamalai |
| 2018/0183930 | A1 | 6/2018 | Raanani et al. |
| 2018/0218733 | A1 * | 8/2018 | Raanani ................. G10L 15/22 |
| 2018/0227432 | A1 | 8/2018 | Caldwell et al. |
| 2019/0028593 | A1 | 1/2019 | Soini et al. |
| 2019/0033085 | A1 | 1/2019 | Ogale et al. |
| 2019/0143527 | A1 | 5/2019 | Favis et al. |
| 2019/0166083 | A1 | 5/2019 | Daniel et al. |
| 2019/0245821 | A1 * | 8/2019 | Crowe ................... H04W 4/12 |
| 2020/0364583 | A1 | 11/2020 | Pedersen |
| 2021/0368330 | A1 | 11/2021 | Kim et al. |
| 2022/0027559 | A1 * | 1/2022 | Wang ................... G06F 40/289 |
| 2022/0086069 | A1 | 3/2022 | Maseedu |
| 2022/0171798 | A1 * | 6/2022 | Wang ................... G06F 16/353 |
| 2022/0247870 | A1 | 8/2022 | Zhang et al. |
| 2022/0248250 | A1 | 8/2022 | Saluja et al. |
| 2023/0086668 | A1 * | 3/2023 | Murakhovs'Ka ..... G06F 16/383 704/235 |

FOREIGN PATENT DOCUMENTS

| | | |
|---|---|---|
| CN | 104221411 A | 12/2014 |
| CN | 105138671 A | 12/2015 |
| CN | 103229587 B | 7/2016 |
| CN | 105915379 A | 8/2016 |
| CN | 103120003 B | 9/2016 |
| CN | 107113303 A | 8/2017 |
| CN | 103220164 B | 10/2018 |
| CN | 108629266 A | 10/2018 |
| CN | 110249705 A | 9/2019 |
| DE | 10105219 A1 | 6/2002 |
| EP | 1518435 B1 | 2/2012 |
| EP | 2832123 A1 | 2/2015 |
| EP | 3001215 A1 | 3/2016 |
| EP | 3076713 A1 | 10/2016 |
| EP | 3202172 A1 | 8/2017 |
| EP | 3371749 A1 | 9/2018 |
| EP | 3422257 A1 | 1/2019 |
| EP | 3435706 A1 | 1/2019 |
| EP | 3590275 B1 | 5/2021 |
| JP | 2000516061 A | 11/2000 |
| JP | 2001514806 A | 9/2001 |
| JP | 3302367 B2 | 7/2002 |
| JP | 2005530430 A | 10/2005 |
| JP | 2007166627 A | 6/2007 |
| JP | 2012507736 A | 3/2012 |
| JP | 2012532804 A | 12/2012 |
| JP | 2013524865 A | 6/2013 |
| JP | 5770310 B2 | 7/2015 |
| JP | 5922136 B2 | 4/2016 |
| JP | 6104874 B2 | 3/2017 |
| JP | 2017098982 A | 6/2017 |
| JP | 6397138 B2 | 9/2018 |
| JP | 6926337 B2 | 8/2021 |
| KR | 20000064508 A | 11/2000 |
| KR | 100827952 B1 | 5/2008 |
| KR | 101109558 B1 | 2/2012 |
| KR | 101363594 B1 | 2/2014 |
| KR | 101540292 B1 | 7/2015 |
| KR | 20160124223 A | 10/2016 |
| KR | 20170001550 A | 1/2017 |
| KR | 101922182 B1 | 11/2018 |
| WO | 0025536 A1 | 5/2000 |
| WO | 03107713 A1 | 12/2003 |
| WO | 2013148402 A1 | 10/2013 |
| WO | 2014074936 A2 | 5/2014 |
| WO | 2016073935 A1 | 5/2016 |
| WO | 2016197058 A1 | 12/2016 |
| WO | 2017041372 A1 | 3/2017 |
| WO | 2017079568 A1 | 5/2017 |
| WO | 2017152176 A1 | 9/2017 |
| WO | 2017184723 A1 | 10/2017 |
| WO | 2017189559 A1 | 11/2017 |
| WO | 2018085696 A2 | 5/2018 |
| WO | 2018125996 A1 | 7/2018 |
| WO | 2018157955 A1 | 9/2018 |
| WO | 2019023628 A1 | 1/2019 |
| WO | 2020128455 A2 | 6/2020 |
| WO | 2020174482 A1 | 9/2020 |
| WO | 2021139241 A1 | 7/2021 |
| WO | 2021173240 A1 | 9/2021 |
| WO | 2021236212 A1 | 11/2021 |

\* cited by examiner

| Startoffsetinms | Endoffsetinms | query_group_nm_L3 | Speaker |
|---|---|---|---|
| 207260 | 212980 | CR - L3 - Involuntary Suspend Mentions | User |
| 212800 | 212980 | CR - L3 - Account Balance Mentions | User |
| 230740 | 230900 | CR - L3 - Port In Mentions | User |
| 294860 | 306420 | CR - L3 - Making a Payment Mentions | Representative |
| 305080 | 305140 | CR - L3 - Charge Mentions | User |
| 305200 | 307700 | CR - L3 - Charge Mentions | Representative |
| 316040 | 316660 | CR - L3 - App Mentions | Representative |
| 324460 | 325620 | CR - L3 - App Mentions | Representative |
| 326960 | 328180 | CR - L3 - T-Mobile.com Mentions | Representative |

*FIG. 4*

PREDICTING A LIKELIHOOD OF A PREDETERMINED ACTION ASSOCIATED WITH A MOBILE DEVICE

CROSS-REFERENCE TO RELATED APPLICATIONS

This application claims the benefit of U.S. Provisional Patent Application No. 63/419,629, filed on Oct. 26, 2022, entitled PREDICTING A LIKELIHOOD OF A PREDETERMINED ACTION ASSOCIATED WITH A MOBILE DEVICE, which is hereby incorporated by reference in its entirety.

BACKGROUND

A wireless telecommunication network providing cellular connectivity to millions of mobile devices is a complex system whose operational efficiency, such as network load, needs to be maintained. Certain actions performed by the mobile devices can affect the operational efficiency, e.g., network load of the network. For example, adding new mobile devices or removing old mobile devices can increase or decrease network load on the wireless telecommunication network. Predicting such actions that can affect the network load, and then either preventing them or preparing for them in advance, can maintain the network's efficiency.

BRIEF DESCRIPTION OF THE DRAWINGS

Detailed descriptions of implementations of the present invention will be described and explained through the use of the accompanying drawings.

FIG. 4 shows a summary associated with the interaction.

Figure 1:
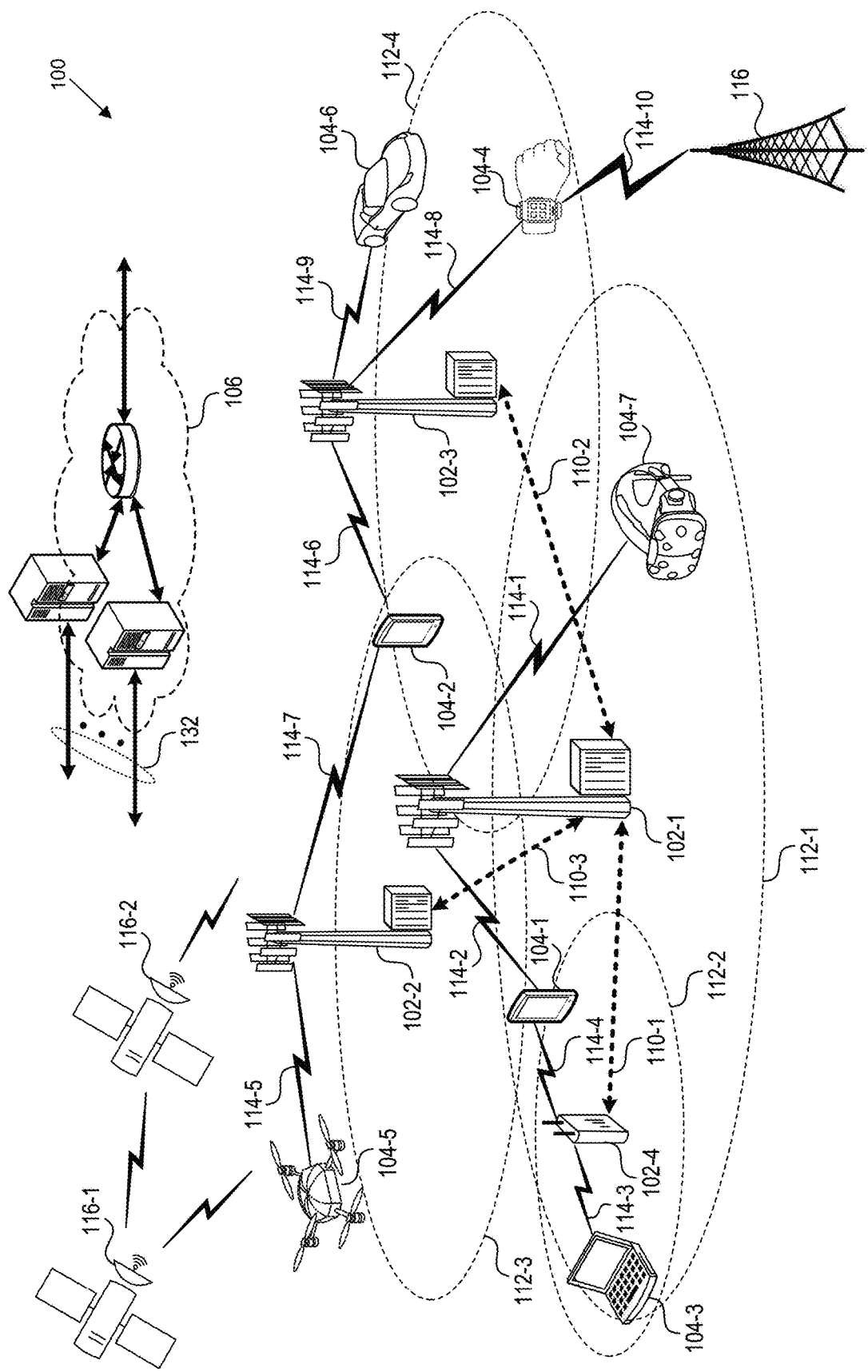
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to predict a likelihood that mobile devices will disassociate from a wireless telecommunication network thus impacting the network. The system obtains a recording of a conversation between each user of a mobile device and a representative of the wireless telecommunication network, where the recording can be a transcription of speech to text. The system obtains a summary associated with the transcription of the conversation, where the summary includes an indication of a topic associated with a portion of the conversation, a time when the topic was discussed in the conversation, and a speaker associated with the topic. The topic is selected from multiple predetermined topics including involuntary suspend, account balance, port-in mentions, making a payment, charge, application, particular website, etc.

The system obtains multiple inputs, referred to herein as key performance indices (KPIs), including at least three of:
 a length of time the mobile device has been served by the wireless telecommunication network,
 a length of time the representative has represented the wireless telecommunication network,
 a net promoter score associated with the representative indicating past performance associated with the representative, and
 a handle location indicating a geolocation associated with the mobile device.

The system provides the summary associated with the conversation and the multiple inputs to a convolutional neural network configured to predict the likelihood that the mobile device will disassociate from the wireless telecommunication network. The system receives from the neural network the likelihood that the mobile device will disassociate and whether the likelihood is above a predetermined threshold, such as 50%. Upon determining that the likelihood is above the predetermined threshold, the system performs an action such as offering additional information and/or offering discounts.

Further, the disclosed system establishes a connection between a mobile device and a terminal of a selected representative of a wireless telecommunication network. The system obtains data regarding an undesirable action associated with the mobile device from multiple undesirable actions, where the multiple undesirable actions include disassociating from the wireless telecommunication network or seeking another interaction with the representative of the wireless telecommunication network. The system obtains multiple KPIs, where the multiple KPIs can be the same as the multiple inputs described above.

The system obtains multiple groups of representatives configured to connect to the mobile device, where group A among the multiple groups is associated with fewer occurrences of the undesirable action than group B. Based on the KPIs associated with the mobile device, the system determines whether a likelihood of the undesirable action occurring is above a predetermined threshold, such as 40%. Upon determining that the likelihood of the undesirable action occurring is above the predetermined threshold, the system connects the mobile device with a representative from the first group.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a UE, a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QoS) requirements and multi-terabits per second data transmission in the era of 6G and beyond, such as terabit-per-second backhaul systems, ultrahigh-definition content streaming among mobile devices, ARNR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
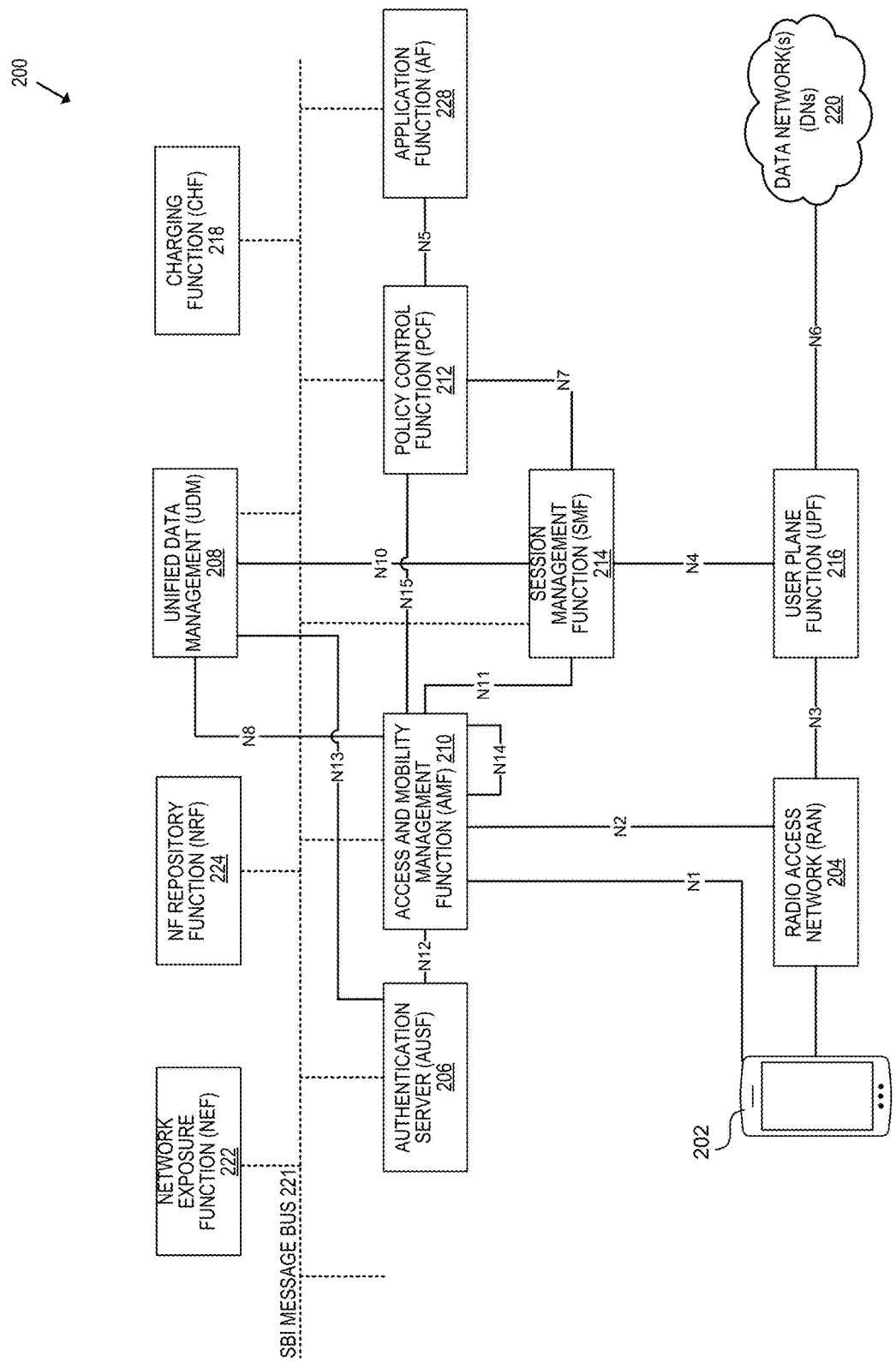
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), providing authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes network slice selection, which is regulated by the NSSF 226.

Predicting a Likelihood of a Predetermined Action Associated with a UE

Figure 3:
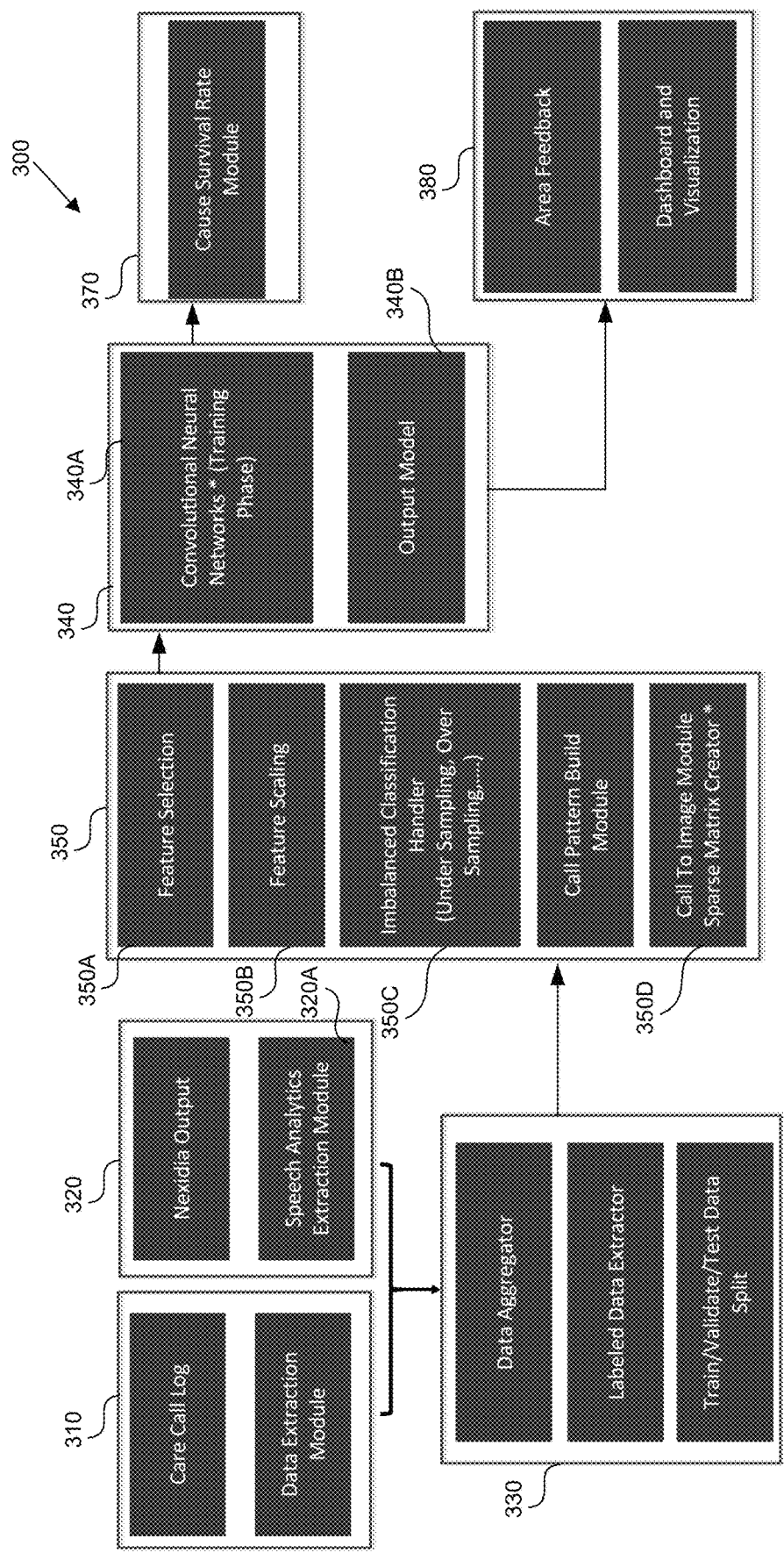
FIG. 3 shows an overview of the architecture of the system.

FIG. 3 shows an overview of the architecture of the system 300. Module 310 receives a record of interactions between a UE and the network 100 in FIG. 1. The interaction can be a conversation between the user of the UE and the representative of the network 100. The representative of the network can be a person, a chat bot, or an AI. Module 320 can convert the recording to text.

Module 320, such as Nexidia software, can analyze the recording by performing natural language processing (NLP) and speech to text conversion. Module 320 can include a submodule 320A that can produce a summary associated with the interaction, as further explained in FIG. 4.

Figure 5:
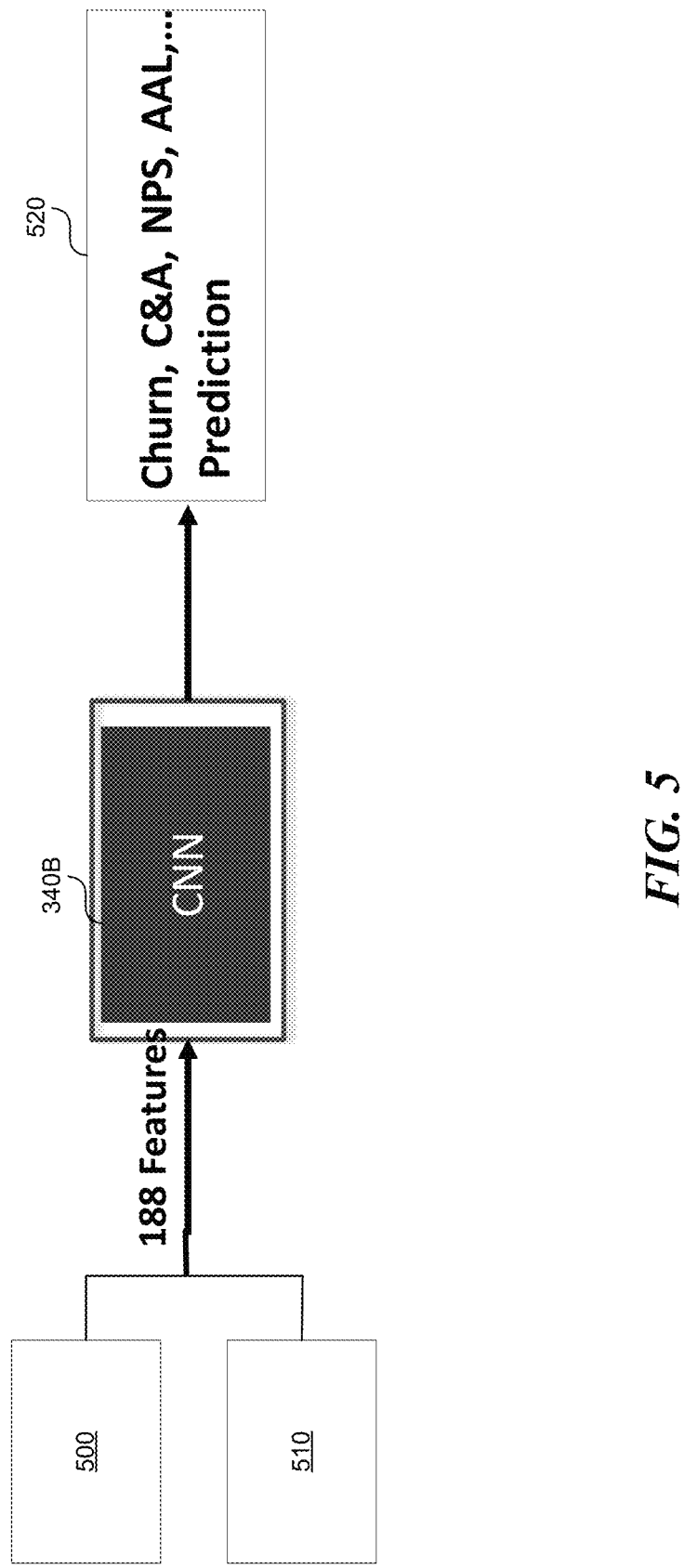
FIG. 5 shows two inputs combined and provided to an artificial intelligence (AI).

Module 330 can obtain additional inputs as explained in FIG. 5, and can aggregate the summary and the additional inputs to generate training, validation, and testing data for the AI 340B.

Module 350 can prepare the training, validation, and testing data for consumption by the AI 340B. Module 350 can include submodules 350A, 350B, 350C to perform feature selection and feature scaling and to ensure that the training, validation, and testing data does not cause an overfitted or an underfitted AI 340B. In addition, module 350 can include submodule 350D that can create an appropriate input for the AI 340B.

For example, the AI 340B can be a convolutional neural network (CNN), which takes as input an image. In that case, the submodule 350D can generate an image to provide as input to the CNN 340B.

Module 340A can be a training module. The training module 340A can produce the AI 340B, such as a CNN, as output.

Module 370 can analyze an interaction that the AI 340B identified as problematic, and can determine how responsible the representative of the network 100 is for the problematic, e.g., undesirable, interaction or outcome.

Module 380 can create a dashboard and a visualization of the interactions with the network 100. For example, module 380 can create a visualization of different geographic areas, and the number of problematic calls in different geographic areas. For example, the visualization can identify a region with a high number of problematic calls.

FIG. 4 shows a summary associated with the interaction. The summary 400 can be produced by submodule 320A in FIG. 3. The summary 400 can include indication of a topic 410 associated with a portion of the interaction, a time 420, 430 when the topic was discussed in the interaction, and a speaker 440 associated with the topic 410. Specifically, the time can indicate the start time 420 and the end time 430 associated with the topic 410. The speaker 440 associated with the topic 410 can be a user of the UE or a representative of the network 100 in FIG. 1.

The topic 410 can be selected from a set of predetermined topics such as involuntary suspend, account balance, port-in, making the payment, charge, application, website, etc. There can be hundreds of predetermined topics, e.g., 200 topics, from which to select the topic 410.

FIG. 5 shows two inputs combined and provided to the AI. Input 500 can include the summary 400 in FIG. 4 including the time 420, 430, the speaker 440, and the topic 410. Input 510, e.g., a KPI, can include additional inputs associated with the UEs and the representative of the network 100 in FIG. 1. Input 500 provides approximately 90% of the total inputs to the AI 340B, while input 510 provides approximately 10% of the total inputs to the AI.

Input 510 can include:
- an account tenure indicating a length of time the mobile device has been served by the wireless telecommunication network,
- a representative tenure indicating a length of time the representative has represented the wireless telecommunication network,
- a net promoter score associated with the representative indicating past performance associated with the representative,
- a handle location indicating a geolocation associated with the mobile device,
- a bill change indicating a change to a bill associated with the mobile device,
- a credit class indicating credit history associated with the mobile device,
- a delinquent balance associated with the mobile device, or multiple delinquency indicators associated with the mobile device indicating a likelihood of the mobile device defaulting on a payment associated with the wireless telecommunication network.

Based on the inputs 500, 510, the AI 340B can produce an output 520. The output 520 can indicate a likelihood that a UE will disassociate from the network 100. The output 520 can predict a likelihood that the user will add an additional UE to the network 100. The output 520 can predict a likelihood that the user will accept a particular offer from the network 100, such as adding a home device. The output 520 can predict a likelihood of another interaction with the network 100, such as a call to a customer care center. The output 520 can predict feedback, e.g., net promoter score, that a user would give to the representative of the network 100 after completion of an interaction, even when the user does not take the time to provide feedback. The output 520 can predict an amount of credit or adjustments that needs to be given to the UE upon completion of the interaction.

In some cases, the UE can be engaged in multiple interactions, such as five interactions, with the network 100, but at the end of the five interactions, the UE can disassociate from the network 100. The AI 340B can determine which of the multiple interactions likely caused the UE to disassociate from the network 100. For example, the AI 340B can analyze all of the multiple interactions and produce a likelihood that the UE will disassociate from the network 100 for each of the interactions. The interaction with the highest likelihood most likely caused the UE to disassociate from the network 100. The system can further analyze the interaction with the highest likelihood to determine further root causes, such as to what degree the disassociation is due to the representative of the network 100.

The AI 340B can be a CNN, taking images as input. Therefore, the system can combine inputs 500, 510 into an image to provide as input to the CNN 340B.

Figure 6:
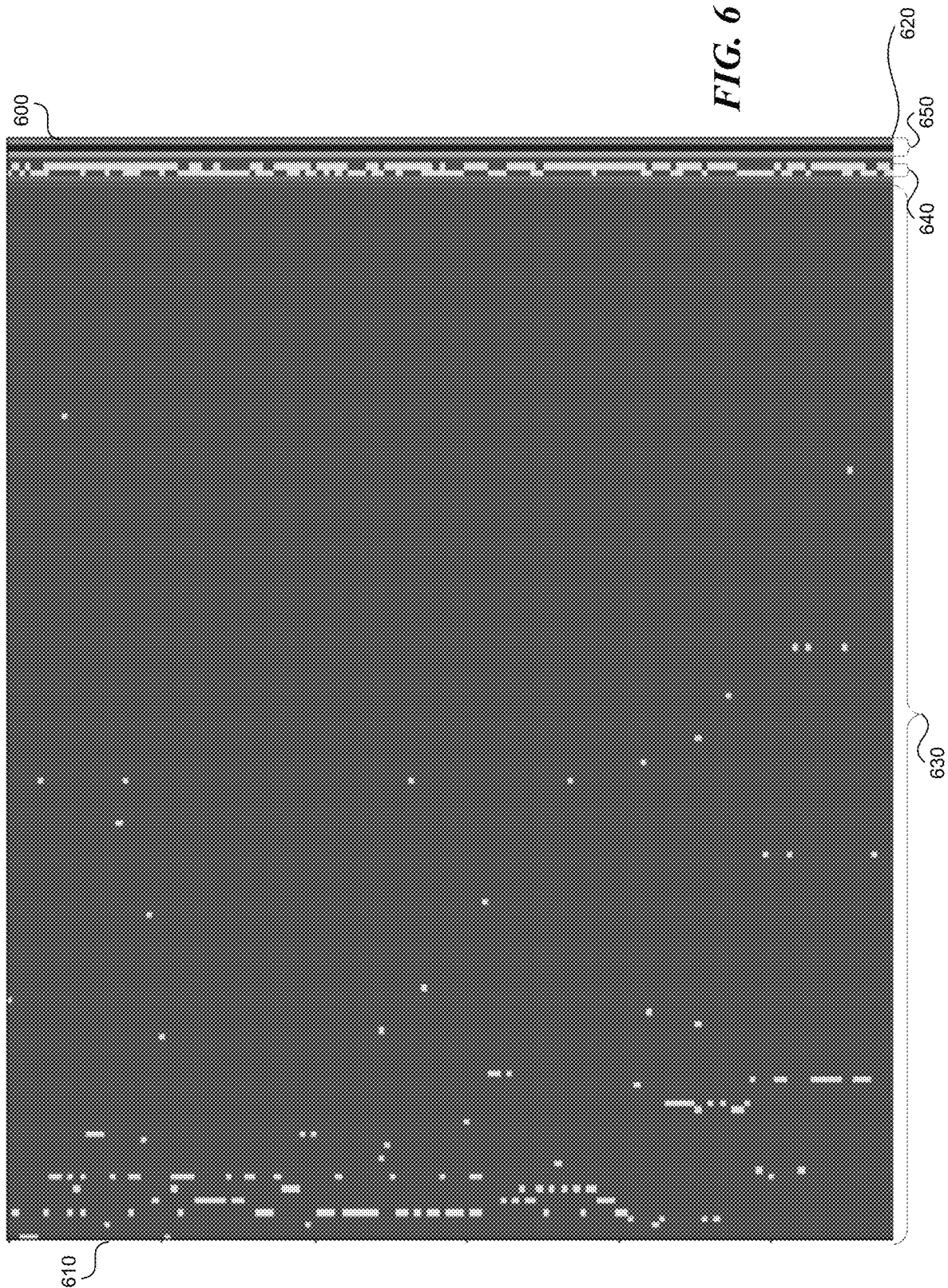
FIG. 6 shows an image provided as input to the AI.

FIG. 6 shows an image provided as input to the AI. The image 600 can represent inputs 500, 510 in FIG. 5. The Y-axis 610 of the image 600 represents time and corresponds to the duration of an interaction between the UE and the network 100. A first portion 630 of the X-axis 620 associated with the image 600 represents multiple predetermined topics, such as topics 410 in FIG. 4. A second portion 640 of the X-axis 620 represents the speaker associated with the interaction. A third portion 650 of the X-axis 620 represents an input among the multiple inputs 510 in FIG. 5. As can be seen in the image 600, only a small portion of the predetermined topics is associated with the interaction, and the multiple inputs 510 do not change value during the duration of the interaction. Further, as can be seen in the second portion 640, the speakers take turns during the interaction.

Figure 7:
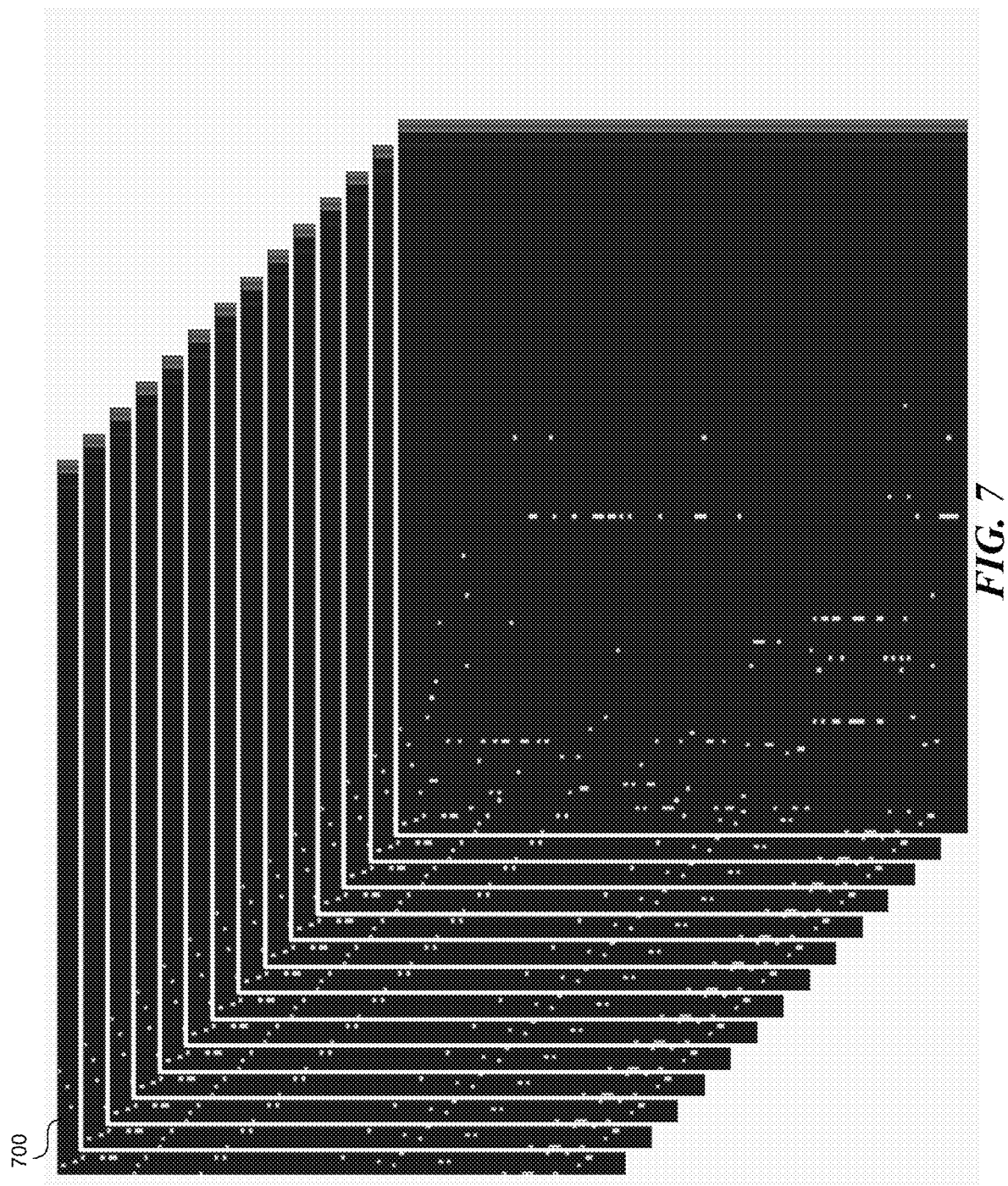
FIG. 7 shows multiple images provided as input to the AI.

FIG. 7 shows multiple images provided as input to the AI. The training module 340A in FIG. 3 can generate multiple images 700 based on the multiple interactions and multiple inputs to provide to the AI, e.g., CNN, 340B.

Figure 8:
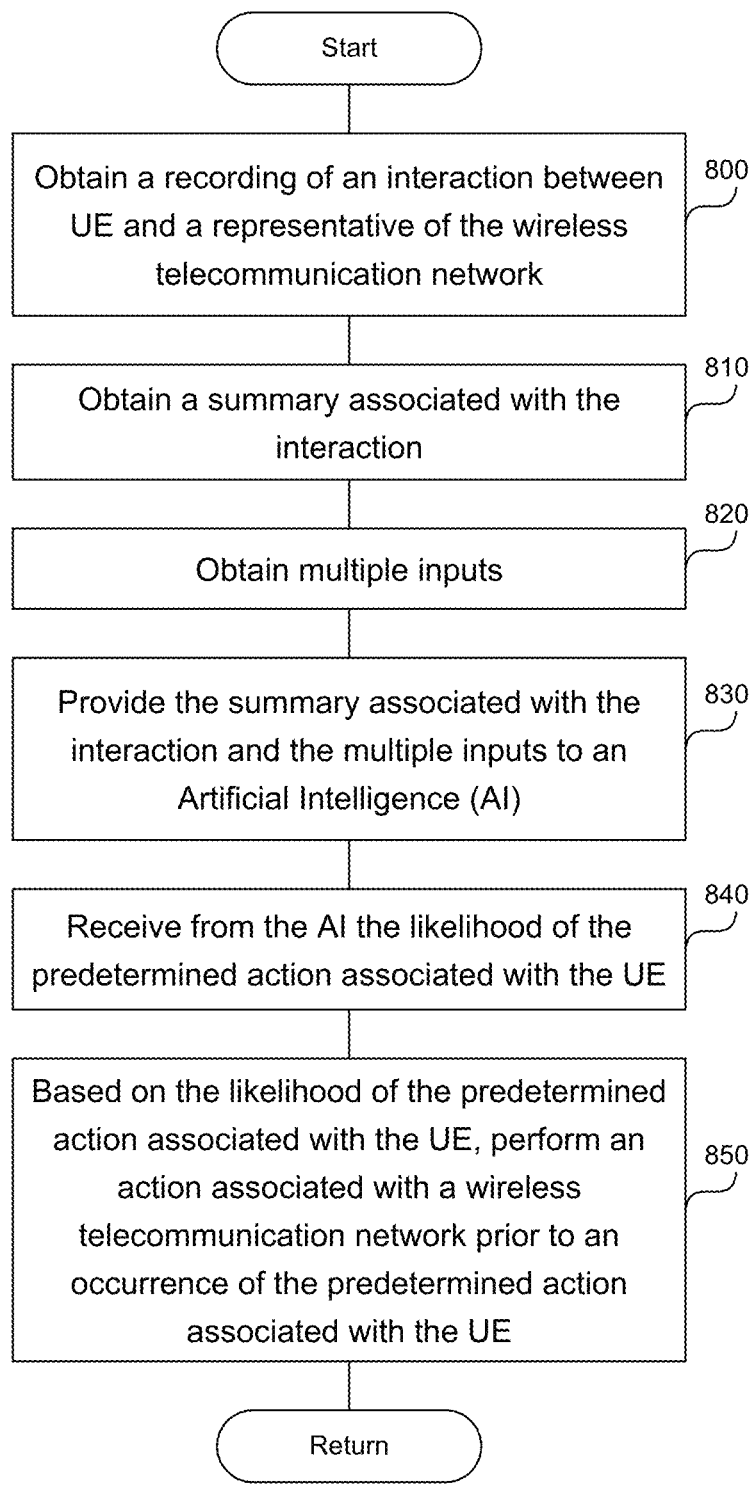
FIG. 8 is a flowchart of a method to predict a likelihood of a predetermined action associated with a user equipment (UE).

FIG. 8 is a flowchart of a method to predict a likelihood of a predetermined action associated with the UE. By predicting an action from the predetermined set of actions, the network 100 can take steps prior to the action occurring. Consequently, the network 100 can increase efficiency of the network 100 by balancing load on the network but preventing undesirable UE actions from occurring, or ameliorating effects of undesirable UE actions.

A hardware or software processor executing instructions described in this application can, in step 800, obtain a recording of an interaction between a UE and a representative of the wireless telecommunication network. The interaction can be a voice call, a text conversation, or a communication according to a predetermined protocol, such as a Session Initiation Protocol (SIP) protocol. The representative can be a person, a chatbot, or an AI.

In step 810, the processor can obtain a summary associated with the interaction, where the summary includes an indication of a topic associated with a portion of the interaction, a time when the topic was present in the interaction, and a generator of the portion of the interaction, e.g., a speaker, associated with the topic. The topic can be selected from multiple predetermined topics such as involuntary suspend, account balance, port-in, making the payment, charge, application, particular website, etc. The multiple predetermined topics can number in the hundreds.

In step 820, the processor can obtain multiple inputs describing the UE or the representative of the wireless telecommunication network. The multiple inputs can include:
 a length of time the UE has been served by the wireless telecommunication network,
 a length of time the representative has represented the wireless telecommunication network,
 a net promoter score associated with the representative indicating past performance associated with the representative,
 a handle location indicating a geolocation associated with the UE,
 a bill change indicating a change to a bill associated with the UE,
 a credit class indicating credit history associated with the UE,
 a delinquent balance associated with the UE, or
 multiple delinquency indicators associated with the UE indicating a likelihood of the UE defaulting on a payment associated with the wireless telecommunication network.

In step 830, the processor can provide the summary associated with the interaction and the multiple inputs to an AI configured to predict a likelihood of a predetermined action associated with the UE. The AI can be a CNN. The predetermined action can include disassociating from the wireless telecommunication network, adding a UE to the wireless telecommunication network, accepting an offer from the wireless telecommunication network, or other actions described in this application.

In step 840, the processor can receive from the AI the likelihood of the predetermined action associated with the UE. For example, the processor can determine whether the likelihood that the UE will disassociate from the wireless telecommunication network is above a predetermined threshold, such as 50%.

In step 850, based on the likelihood of the predetermined action associated with the UE, the processor can perform an action associated with a wireless telecommunication network prior to an occurrence of the predetermined action associated with the UE. For example, upon determining that the likelihood that the UE will disassociate from the wireless telecommunication network is above the predetermined threshold, the processor can perform an action to retain the UE at the wireless telecommunication network, such as offering additional information or offering discounts.

The processor can provide a net promoter score upon termination of the interaction, even when the user does not provide feedback regarding the interaction. The processor can obtain a net promoter score associated with the representative of the wireless telecommunication network from a user that did engage in a post-interaction survey. The processor can obtain a second summary associated with a second interaction between the UE and the wireless telecommunication network, and a second multiplicity of inputs. The processor can train a second AI to receive the second summary associated with a second interaction and the second multiplicity of inputs and produce the second net promoter score. The AI and the second AI can be the same, or different. The processor can provide the summary associated with the interaction and the multiple inputs to the second AI trained to produce the second net promoter score, without providing the net promoter score associated with the interaction. The processor can obtain the second net promoter score associated with the representative of the wireless telecommunication network from the second AI.

The processor can predict a likelihood of a subsequent interaction with the wireless telecommunication network, and can prevent the subsequent interaction with the network by sending necessary information to the UE. The processor can provide the summary associated with the interaction and the multiple inputs to an AI configured to predict a likelihood of a subsequent interaction between the UE and the representative of the wireless telecommunication network. The processor can receive from the AI the likelihood of the subsequent interaction between the UE and the representative of the wireless telecommunication network. The processor can determine whether the likelihood of the subsequent interaction between the UE and the representative of the wireless telecommunication network is above a predetermined threshold, such as 50%. Upon determining that the likelihood of the subsequent interaction between the UE and the representative of the wireless telecommunication network is above the predetermined threshold, the processor can send additional information to the UE prior to the UE initiating the subsequent interaction. By doing so, the processor can reduce traffic within the network.

The processor can create an image representing the summary of the interaction and the multiple inputs. A Y-axis associated with the image represents time during which the interaction occurred. A first portion of an X-axis associated with the image represents the multiple predetermined topics. A second portion of the X-axis associated with the image represents the speaker associated with the interaction. A third portion of the X-axis associated with the image represents an input among the multiple inputs. The processor can provide the image to the AI as an input.

The processor can train the AI. The processor can obtain multiple recordings of multiple interactions between multiple users of multiple UEs and multiple representatives of the wireless telecommunication network. The processor can obtain multiple summaries associated with the multiple interactions. The processor can obtain multiple inputs associated with the multiple UEs and multiple representatives. Based on the multiple summaries and multiple inputs, the processor can create multiple images, where an image among the multiple images represents a summary of an interaction among the multiple interactions and a subset of inputs among the multiple inputs. A Y-axis associated with the image represents time during which the interaction occurred. A first portion of an X-axis associated with the image represents the multiple predetermined topics. A second portion of the X-axis associated with the image represents the speaker associated with the interaction. A third portion of the X-axis associated with the image represents an input among the multiple inputs. The processor can train the AI using the multiple images.

The processor can identify which interaction among the multiple interactions likely caused the UE to perform the action. The processor can obtain an indication that the UE is disassociating from the wireless telecommunication network. The processor can obtain multiple interactions between the UE and the representative associated with the wireless telecommunication network. The processor can determine multiple likelihoods that the UE will disassociate from the wireless telecommunication network, where each likelihood among the multiple likelihoods is associated with each interaction among the multiple interactions. The processor can determine a particular interaction among the multiple interactions having the highest likelihood among the multiple likelihoods. The processor can determine that the particular interaction caused the disassociating from the wireless telecommunication network. Further, the processor can determine a responsibility of the representative in causing the action.

The processor can retain the UE at the wireless telecommunication network, or reduce network traffic by sending additional information to the UE or offering a monetary incentive to the UE.

Figure 9A:
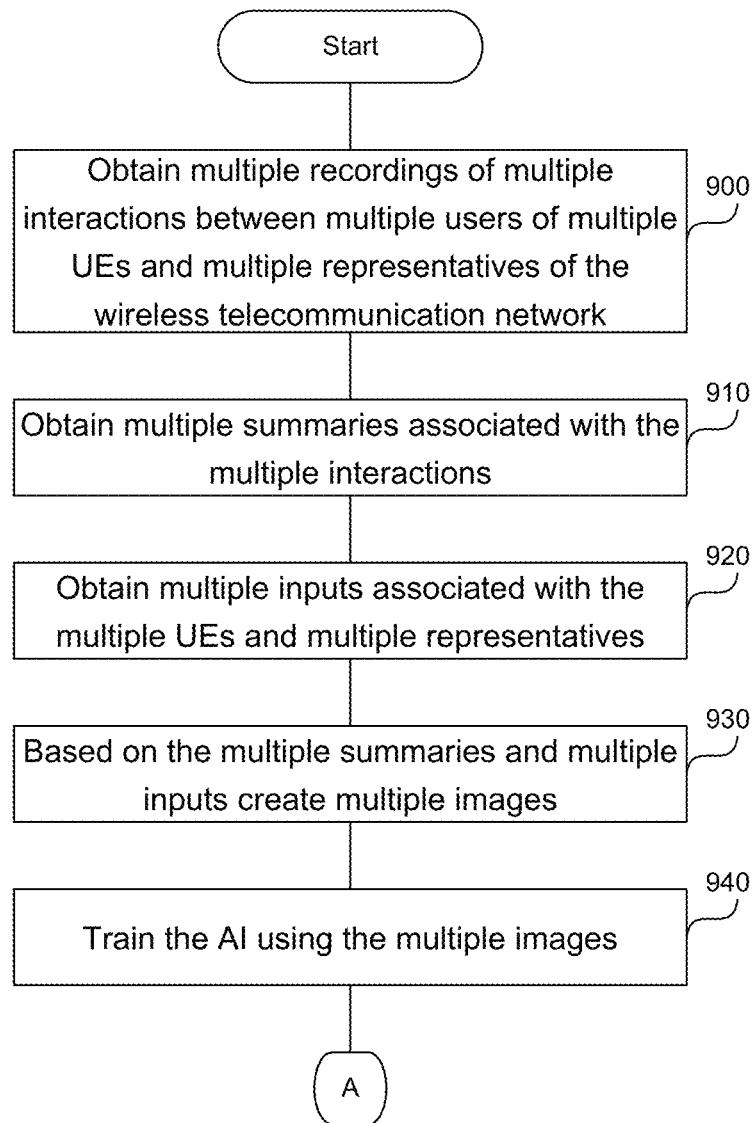
FIGS. 9A-9B show a flowchart of steps that the system can perform to train an AI to predict a likelihood of an action by a UE and, based on the likelihood, perform a preventative action prior to the action by the UE.
Figure 9B:
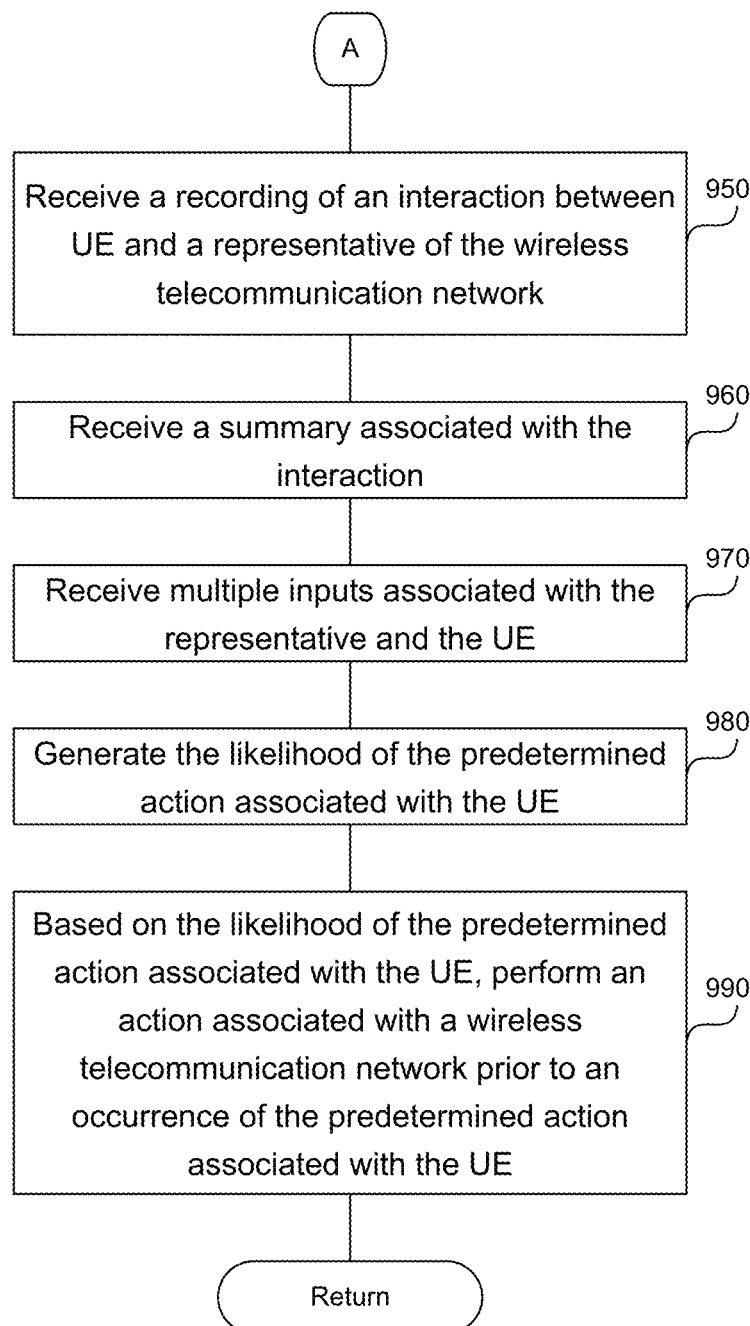

FIGS. 9A-9B show a flowchart of steps the system can perform to train an AI to predict a likelihood of an action by a UE and, based on the likelihood, perform a preventative action prior to the action by the UE.

In step 900, a training module can obtain multiple recordings of multiple interactions between multiple users of multiple UEs and multiple representatives of the wireless telecommunication network. In step 910, the training module can obtain multiple summaries associated with the multiple interactions. In step 920, the training module can obtain multiple inputs associated with the multiple UEs and multiple representatives.

In step 930, based on the multiple summaries and multiple inputs, the training module can create multiple images, where an image among the multiple images represents a summary of an interaction among the multiple interactions and a subset of inputs among the multiple inputs. A Y-axis associated with the image represents time during which the interaction occurred. A first portion of an X-axis associated with the image represents the multiple predetermined topics. A second portion of the X-axis associated with the image represents the speaker associated with the interaction. A third portion of the X-axis associated with the image represents an input among the multiple inputs.

In step 940, the training module can train the AI using the multiple images.

In step 950, the AI can receive a recording of an interaction between the UE and a representative of the wireless telecommunication network. The representative can be a person, a chat bot, or a different AI.

In step 960, the AI can receive a summary associated with the interaction, where the summary includes an indication of a topic associated with a portion of the interaction, a time when the topic was discussed in the interaction, and a speaker associated with the topic. The topic can be selected from multiple predetermined topics.

In step 970, the AI can receive multiple inputs associated with the representative and the UE. The multiple inputs can include:
- a length of time the UE has been served by the wireless telecommunication network,
- a length of time the representative has represented the wireless telecommunication network,
- a net promoter score associated with the representative indicating past performance associated with the representative,
- a handle location indicating a geolocation associated with the UE,
- a bill change indicating a change to a bill associated with the UE, a credit class indicating credit history associated with the UE, a delinquent balance associated with the UE, and multiple delinquency indicators associated with the UE indicating a likelihood of the UE defaulting on a payment associated with the wireless telecommunication network.

In step 980, the AI can generate the likelihood of the predetermined action associated with the UE. The predetermined action can include the UE disassociating from the wireless telecommunication network, adding a UE to the wireless telecommunication network, or accepting an offer from the wireless telecommunication network.

In step 990, based on the likelihood of the predetermined action associated with the UE, a processor associated with the system can perform an action associated with a wireless telecommunication network prior to an occurrence of the predetermined action associated with the UE. For example, the processor can determine whether the likelihood that the UE will disassociate from the wireless telecommunication network is above a predetermined threshold, such as 50%. Upon determining that the likelihood is above the predetermined threshold, the processor can perform an action to retain the UE at the wireless telecommunication network, such as offering additional information or offering discounts.

The training module can obtain a net promoter score associated with the representative of the wireless telecommunication network, and indicating past performance of the representative. The training module can obtain a second summary associated with a second interaction between the UE and the wireless telecommunication network, and a second multiplicity of inputs. The training module can train a second AI to receive the second summary associated with the second interaction and the second multiplicity of inputs and produce a second net promoter score. The AI can receive the summary associated with the interaction and the multiple inputs, when the user does not provide an evaluation of interactions such as the net promoter score. The AI can provide, or generate, the net promoter score associated with the representative of the wireless telecommunication network from the second AI.

The AI can predict another call to a care center and send necessary information. For example, the AI can receive the summary associated with the interaction and the multiple inputs. The AI can predict a likelihood of a subsequent interaction between the UE and the representative of the wireless telecommunication network. The processor can determine whether the likelihood of the subsequent interaction between the UE and the representative of the wireless telecommunication network is above a predetermined threshold, such as 30%. Upon determining that the likelihood of the subsequent interaction between the UE and the representative of the wireless telecommunication network is above the predetermined threshold, the processor can send additional information to the UE prior to the UE initiating the subsequent interaction. Thus, the processor can reduce the number of calls to the care center.

The processor can create an image to provide to the AI. The image can represent a summary of the interaction and the multiple inputs. A Y-axis associated with the image represents time during which the interaction occurred. A first portion of an X-axis associated with the image can represent the multiple predetermined topics. A second portion of the X-axis associated with the image can represent the speaker associated with the interaction. A third portion of the X-axis associated with the image can represent an input among the multiple inputs. The processor can provide the image to the AI as an input.

The processor can obtain an indication that the UE is disassociating from the wireless telecommunication network. The processor can obtain multiple interactions between the user associated with the UE and the representative associated with the wireless telecommunication network. The processor can determine multiple likelihoods that the UE will disassociate from the wireless telecommunication network, where each likelihood among the multiple likelihoods is associated with each interaction among the multiple interactions. The processor can determine a particular interaction among the multiple interactions having the highest likelihood among the multiple likelihoods. The processor can determine that the particular interaction caused the disassociating from the wireless telecommunication network. In addition, the processor can further determine a responsibility of the representative for the UE action, as described below.

Figure 10:
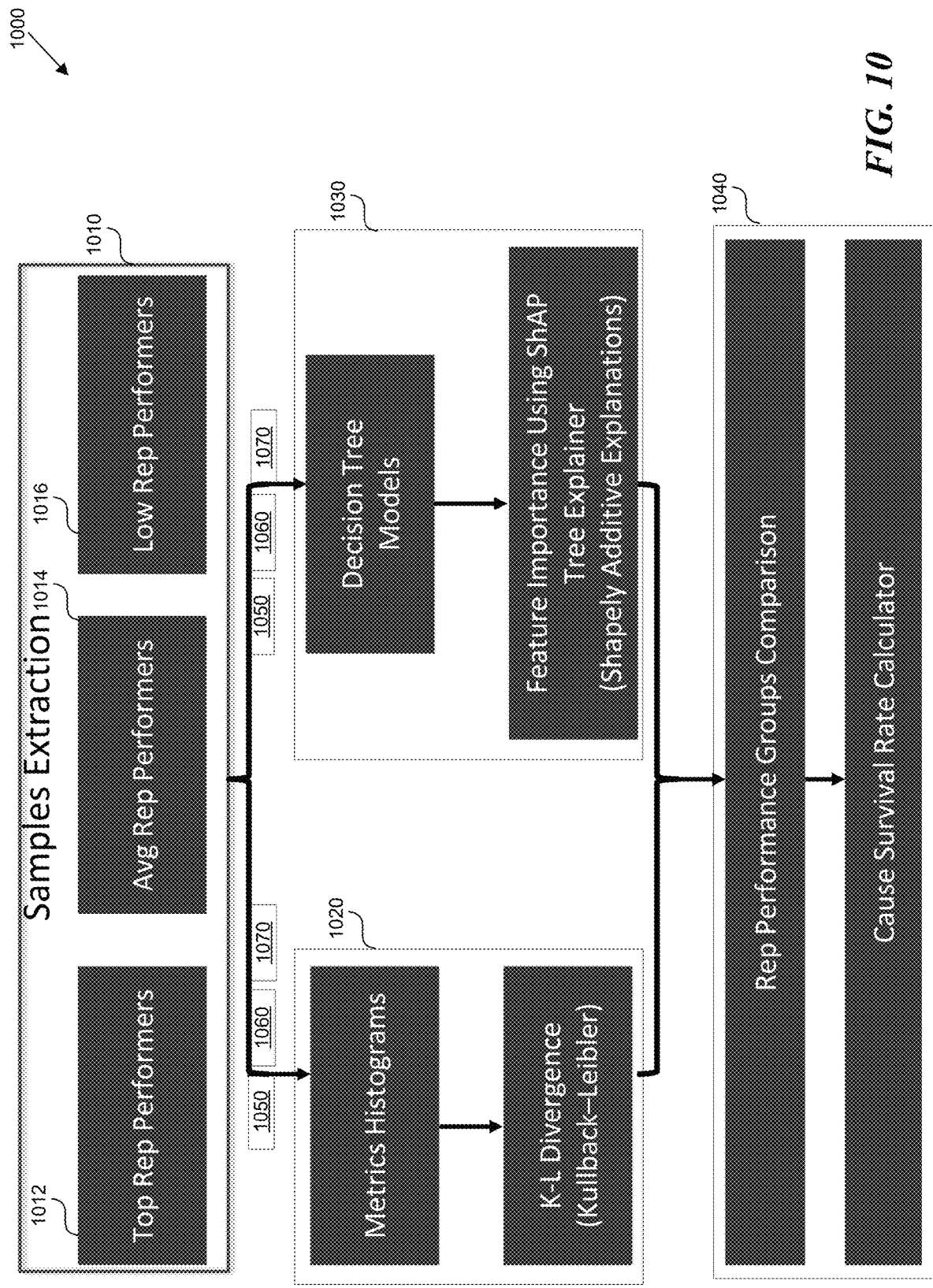
FIG. 10 shows a system to determine a responsibility of a representative of the wireless telecommunication network when a problematic interaction occurs.

Establishing a Connection Between a Mobile Device and a Representative of the Wireless Telecommunication Network FIG. 10 shows a system to determine a responsibility of a representative of the wireless telecommunication network when a problematic interaction occurs. The system 1000 can also be used to establish a connection between a UE and a representative of the wireless telecommunication network to avoid problematic interactions. The system 1000 can include a sample extraction module 1010, a distribution analysis module 1020, a ranking module 1030, and a responsibility analysis module 1040.

The sample extraction module 1010 can group the representatives of the wireless telecommunication network into multiple groups such as two or three groups 1012, 1014, 1016. The group 1012 can include the best performers, the group 1014 can include the average performers, and the group 1016 can include the worst performers. In the case of two groups, the representatives can be split into the satisfactory performers and the unsatisfactory performers.

To create the groups 1012, 1014, 1016, the sample extraction module 1010 can divide all the representatives of the wireless telecommunication network into separate groups based on geographic area and the skill set associated with the representatives. From among those groups, the sample extraction module 1010 can create the groups 1012, 1014, 1016. To create the groups 1012, 1014, 1016, the sample extraction module 1010 can obtain multiple performance indicators such as how successful the representatives are in preventing an undesirable action including disassociating from the wireless telecommunication network, seeking another interaction with a representative, not accepting an offer from the wireless telecommunication network, not adding a new device to the wireless telecommunication network, etc. The sample extraction module 1010 can weigh the performance indicators equally, or can weigh a particular performance indicator of interest higher than the others.

The distribution analysis module 1020 can take multiple KPIs 1050, 1060, 1070 associated with multiple calls for each group 1012, 1014, 1016, respectively. The multiple calls all can have an undesirable action occurring after the call. The distribution analysis module 1020 can create a distribution for each KPI among the multiple KPIs 1050, 1060, 1070 for each group 1012, 1014, 1016, respectively. A KPI among the multiple KPIs 1050, 1060, 1070 can be associated with the UE or the representative of the wireless telecommunication network and can include:

an account tenure indicating a length of time the mobile device has been served by the wireless telecommunication network,
a representative tenure indicating a length of time the representative has represented the wireless telecommunication network,
a net promoter score associated with the representative indicating past performance associated with the representative,
a handle location indicating a geolocation associated with the mobile device,
a bill change indicating a change to a bill associated with the mobile device,
a credit class indicating credit history associated with the mobile device,
a delinquent balance associated with the mobile device, or
multiple delinquency indicators associated with the mobile device indicating a likelihood of the mobile device defaulting on a payment associated with the wireless telecommunication network.

For example, a KPI for a delinquent balance associated with the mobile device can have three distributions, where the first distribution represents the distribution of the delinquent balance values associated with the high-performing group 1012, the second distribution represents distribution of delinquent balance values associated with the average-performing group 1014, and the third distribution represents distribution of the delinquent balance values associated with the low-performing group 1016. The distribution analysis module 1020 can compare the first, second, and third distributions, by, for example, using K-L divergence, and can conclude that they are similar because in all the distributions 90% of UEs deactivate when the delinquent amount is above $200. In that case, the distribution analysis module 1020 can assign no responsibility, or low responsibility up to 10%, to a representative whose interaction with the UE was problematic. Alternatively, the distribution analysis module 1020 can indicate that the KPI is irrelevant, and/or that the similarity between the distributions is high. If there is a difference in the first, second, and third distributions, then the distribution analysis module 1020 can indicate that the KPI is relevant and that the distributions are dissimilar, and/or can assign a high responsibility to the representative whose interaction with the UE was problematic.

The ranking module 1030 can take multiple KPIs 1050, 1060, 1070 associated with multiple calls for each group 1012, 1014, 1016, respectively, and, using machine learning, can determine correlation between a KPI among the multiple KPIs and the outcome of the interaction. Based on the correlation, the ranking module 1030 can rank the multiple KPIs 1050, 1060, 1070 into ranking lists, one ranking list for each group 1012, 1014, 1016. The ranking module 1030 can determine whether the rankings are similar between the groups 1012, 1014, 1016. Upon determining the similarity, the ranking module 1030 can indicate how similar the groups are. If the rankings are the same, the ranking module 1030 can assign no blame or low blame to representatives having a problematic interaction in the low-performing group 1016. If the rankings are different, the ranking module 1030 can assign more blame to the representatives having a problematic interaction in the low-performing group 1016.

The responsibility analysis module 1040 can combine the first determination of similarity from the distribution analysis module 1020 and the second determination of similarity from the ranking module 1030 to determine a responsibility of a representative having a problematic interaction in the low-performing group 1016. For example, if the first determination of similarity and the second determination of similarity both indicate high similarity, the responsibility analysis module 1040 can assign no responsibility or low responsibility to the representative having a problematic interaction in the low-performing group 1016. If the first determination of similarity and the second determination of similarity both indicate low similarity, the responsibility analysis module 1040 can assign high responsibility, such as higher than 50%, to the representative having a problematic interaction. If one of the determinations of similarity indicates high similarity, and the other determination of similarity indicates low similarity, the responsibility analysis module 1040 can assign medium responsibility, such as between 30% and 70%, to the representative having the problematic interaction.

Figure 11:
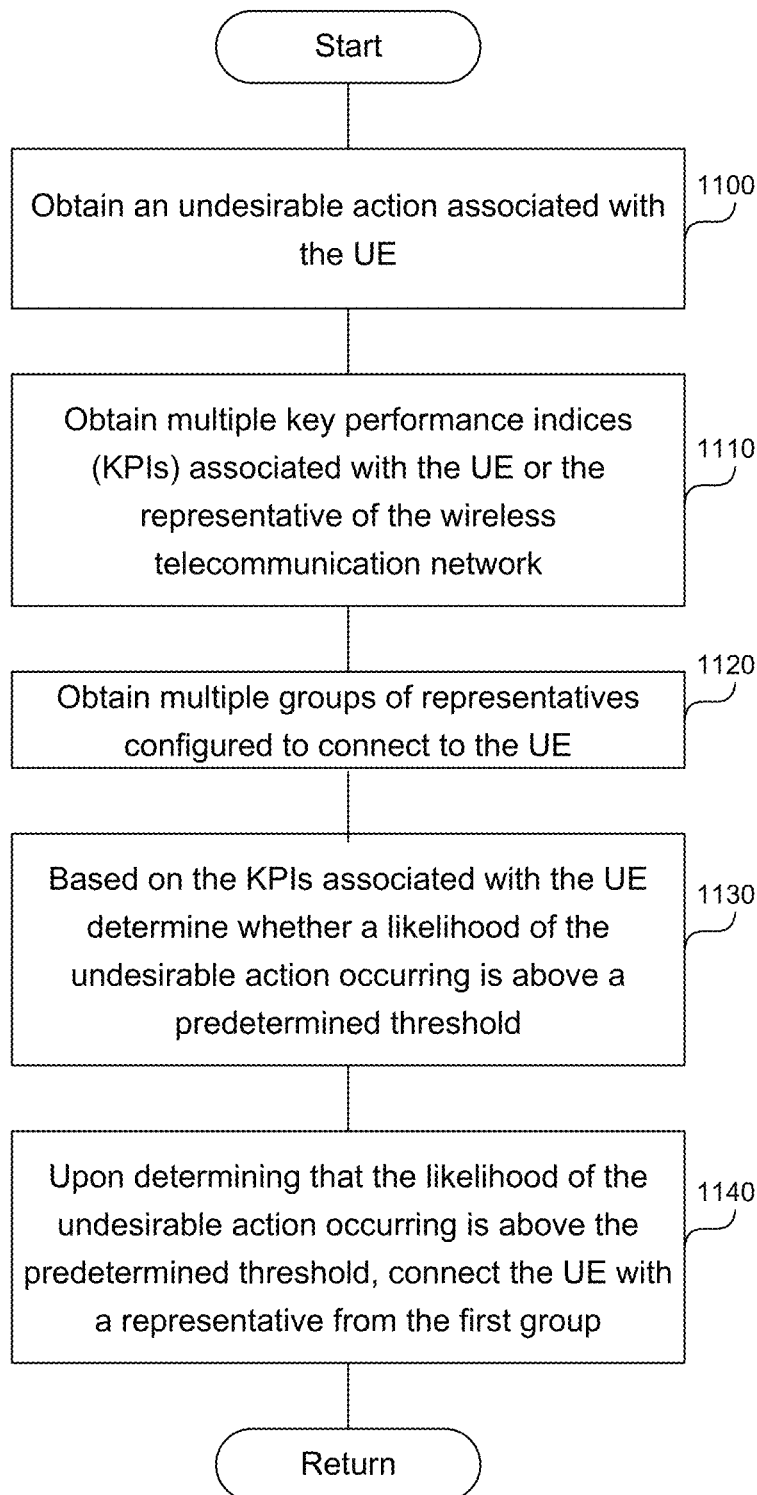
FIG. 11 is a flowchart of a method to establish a connection between a mobile device and a representative of a wireless telecommunication network.

FIG. 11 is a flowchart of a method to establish a connection between a mobile device and a representative of a wireless telecommunication network. In step 1100, a hardware or software processor executing instructions described in this application can obtain an undesirable action associated with the UE from multiple undesirable actions, where the multiple undesirable actions include disassociating from the wireless telecommunication network, seeking another interaction with a representative of the wireless telecommunication network, not accepting an offer presented by the wireless telecommunication network, or avoiding adding another device to the wireless telecommunication network.

In step 1110, the processor can obtain multiple KPIs associated with the UE or the representative of the wireless telecommunication network, where the multiple KPIs include at least two of:
a length of time the UE has been served by the wireless telecommunication network,
a length of time the representative has represented the wireless telecommunication network,
a net promoter score associated with the representative indicating past performance associated with the representative, and
a handle location indicating a geolocation associated with the UE.

In step 1120, a processor can obtain multiple groups of representatives configured to connect to the UE. A representative can be an AI or a chat bot. A first group among the multiple groups is associated with fewer occurrences of the undesirable action than a second group among the multiple groups.

In step 1130, based on the KPIs associated with the UE, the processor can determine whether a likelihood of the undesirable action occurring is above a predetermined threshold, such as 40%. In step 1140, upon determining that the likelihood of the undesirable action occurring is above the predetermined threshold, the processor can connect the UE with a representative from the first group.

The processor can obtain a first multiplicity of KPIs associated with a first multiplicity of interactions having the undesirable action occurring where the representative associated with the wireless telecommunication network belongs to the first group. KPIs can be as described in this application. The processor can obtain a second multiplicity of KPIs associated with a second multiplicity of interactions having the undesirable action occurring where the representative associated with the wireless telecommunication network belongs to the second group. The processor can generate a first distribution of values of a KPI among the first multiplicity of KPIs and a second distribution of values of the KPI among the second multiplicity of KPIs. The processor can determine whether the first distribution and the second distribution are similar to obtain a first determination of similarity. The processor can determine a first multiplicity of correlations between the first multiplicity of KPIs and an occurrence of the undesirable action. The processor can rank the first multiplicity of KPIs based on the first multiplicity of correlations to obtain a first ranking. The ranking can be from highest to lowest or lowest to highest. The ranking can be done using a machine learning model such as a decision tree model. The processor can determine a second multiplicity of correlations between the second multiplicity of KPIs and the occurrence of the undesirable action. The processor can rank the second multiplicity of KPIs based on the second multiplicity of correlations to obtain a second ranking. The ranking can be from highest to lowest or lowest to highest. The processor can determine whether the first ranking and the second ranking are similar to obtain a second determination of similarity. To make the second determination of similarity, the processor can determine that the two rankings are similar if more than 50% of the KPIs are in the same place. Based on the first determination of similarity and the second determination of similarity, the processor can assign responsibility to a representative in the second group.

The processor can obtain a first multiplicity of KPIs associated with a first multiplicity of interactions having the undesirable action occurring where the representative associated with the wireless telecommunication network belongs to the first group. The processor can obtain a second multiplicity of KPIs associated with a second multiplicity of interactions having the undesirable action occurring where the representative associated with the wireless telecommunication network belongs to the second group. The processor can generate a first distribution of values of a KPI among the first multiplicity of KPIs and a second distribution of values of the KPI among the second multiplicity of KPIs. The processor can determine whether the first distribution and the second distribution are similar. Upon determining that the first distribution and the second distribution are similar, the processor can assign a low responsibility value, such as a responsibility value below 50%, to a representative in the second group. Upon determining that the first distribution and the second distribution are not similar, the processor can assign a high responsibility value, such as a responsibility value above 50%, to the representative in the second group.

After obtaining the first multiplicity and the second multiplicity of KPIs, the processor can determine a first multiplicity of correlations between the first multiplicity of KPIs and an occurrence of the undesirable action. The processor can rank the first multiplicity of KPIs based on the first multiplicity of correlations to obtain a first ranking. The ranking can be done using the machine learning model, such as a decision tree model. The processor can determine a second multiplicity of correlations between the second multiplicity of KPIs and the occurrence of the undesirable action. The processor can rank the second multiplicity of KPIs based on the second multiplicity of correlations to obtain a second ranking. The processor can determine whether the first ranking and the second ranking are similar. Upon determining that the first ranking and the second ranking are similar, the processor can assign a low responsibility to a representative in the second group. Low responsibility can indicate a high performance score. Upon determining that the first ranking and the second ranking are not similar, the processor can assign a high responsibility to the representative in the second group. High responsibility can indicate a low performance score.

The processor can obtain multiple representatives associated with the wireless telecommunication network, a geographic area served by a representative among the multiple representatives, and a skill associated with the representative among the multiple representatives. The processor can divide the multiple representatives into a first multiplicity of groups based on the geographic area and the skill, such that the representatives have similar skills and serve similar geographic areas. The processor can obtain multiple performances associated with a group of multiple representatives among the first multiplicity of groups. The processor can divide the group of multiple representatives into the first group and the second group based on the multiple performances, where a first group among the multiple groups is associated with fewer occurrences of the undesirable action than a second group among the multiple groups.

The processor can obtain a first multiplicity of KPIs associated with a first multiplicity of interactions having the undesirable action occurring where the representative associated with the wireless telecommunication network belongs to the first group. The processor can obtain a second multiplicity of KPIs associated with a second multiplicity of interactions having the undesirable action occurring where the representative associated with the wireless telecommunication network belongs to the second group. The processor can determine a first multiplicity of correlations between the first multiplicity of KPIs and an occurrence of the undesirable action. The processor can rank the first multiplicity of KPIs based on the first multiplicity of correlations to obtain a first ranking. The processor can determine a second multiplicity of correlations between the second multiplicity of KPIs and the occurrence of the undesirable action. The processor can rank the second multiplicity of KPIs based on the second multiplicity of correlations to obtain a second ranking. The processor can obtain a first KPI highly correlated to the occurrence of the undesirable action from the first ranking. The processor can obtain a second KPI highly correlated to the occurrence of the undesirable action from the second ranking. The processor can send an indication of the first KPI and the second KPI and a request for an indication of responsibility associated with the first KPI and the second KPI. The processor can receive the indication of responsibility associated with the first KPI and the second KPI. The processor can assign responsibility to a representative from the second group based on the indication of responsibility.

Upon obtaining the first multiplicity of KPIs and the second multiplicity of KPIs, the processor can generate a first distribution of values of a KPI among the first multiplicity of KPIs and a second distribution of values of the KPI among the second multiplicity of KPIs. The processor can determine whether the first distribution and the second distribution are similar, by, for example, using K-L divergence. The processor can determine a first multiplicity of correlations between the first multiplicity of KPIs and an occurrence of the undesirable action. The processor can rank the first multiplicity of KPIs based on the first multiplicity of correlations to obtain a first ranking. The processor can determine a second multiplicity of correlations between the second multiplicity of KPIs and the occurrence of the undesirable action. The processor can rank the second multiplicity of KPIs based on the second multiplicity of correlations to obtain a second ranking. The processor can determine whether the first ranking and the second ranking are similar. Upon determining that the first distribution and the second distribution are similar and that the first ranking and the second ranking are similar, the processor can assign a low responsibility to a representative in the second group. Upon determining that the first distribution and the second distribution are not similar and that the first ranking and the second ranking are not similar, the processor can assign a high responsibility to the representative in the second group. The processor can assign a middle responsibility if at least one comparison results in a similarity.

Upon determining that the likelihood of the undesirable action occurring is below the predetermined threshold, the processor can determine whether the first group or the second group has more bandwidth. Upon determining that the first group has more bandwidth than the second group, the processor can connect the UE with the representative from the first group. Upon determining that the second group has more bandwidth than the first group, the processor can connect the UE with the representative from the second group.

Figure 12A:
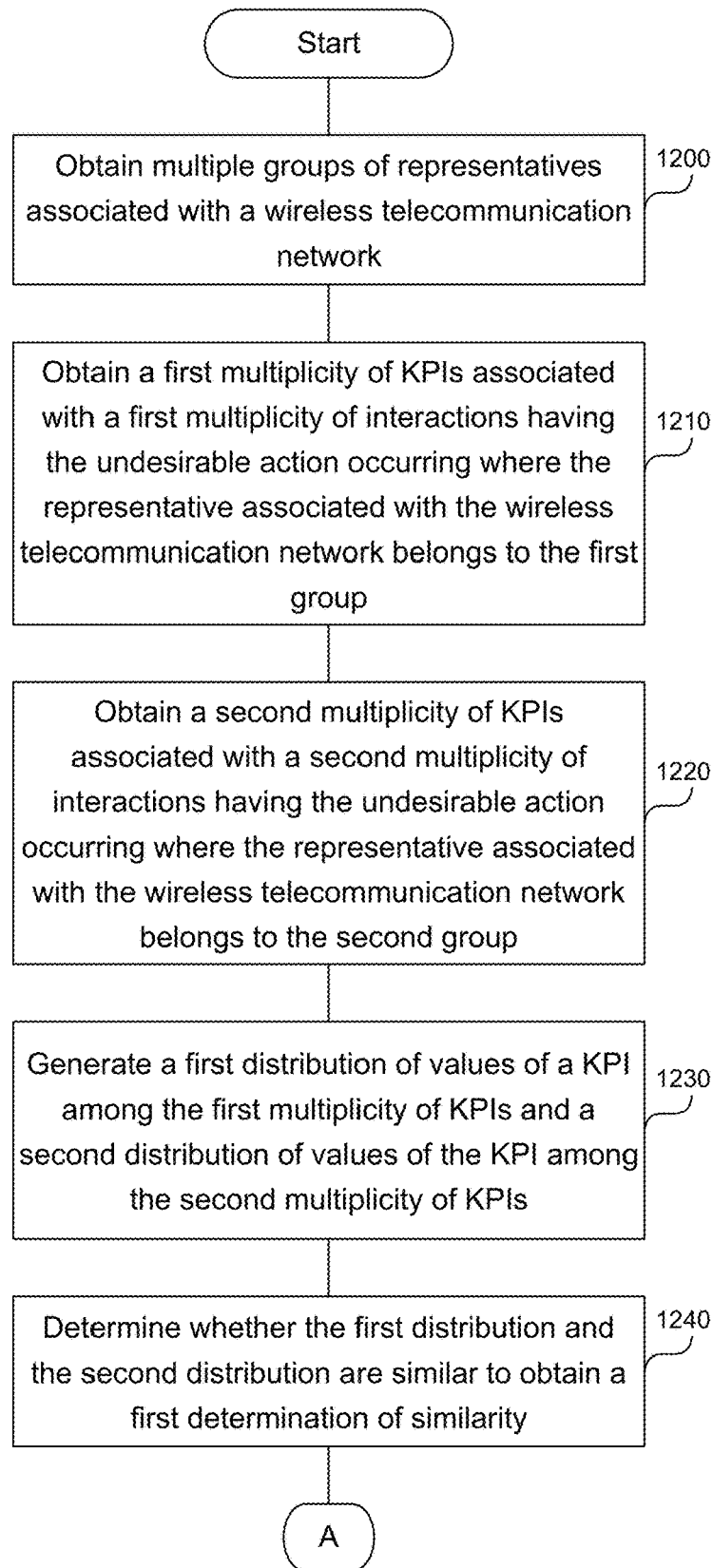
FIGS. 12A-12B show a flowchart of steps that components of the system can perform to determine a responsibility of a representative of a network for a problematic interaction with a UE.
Figure 12B:
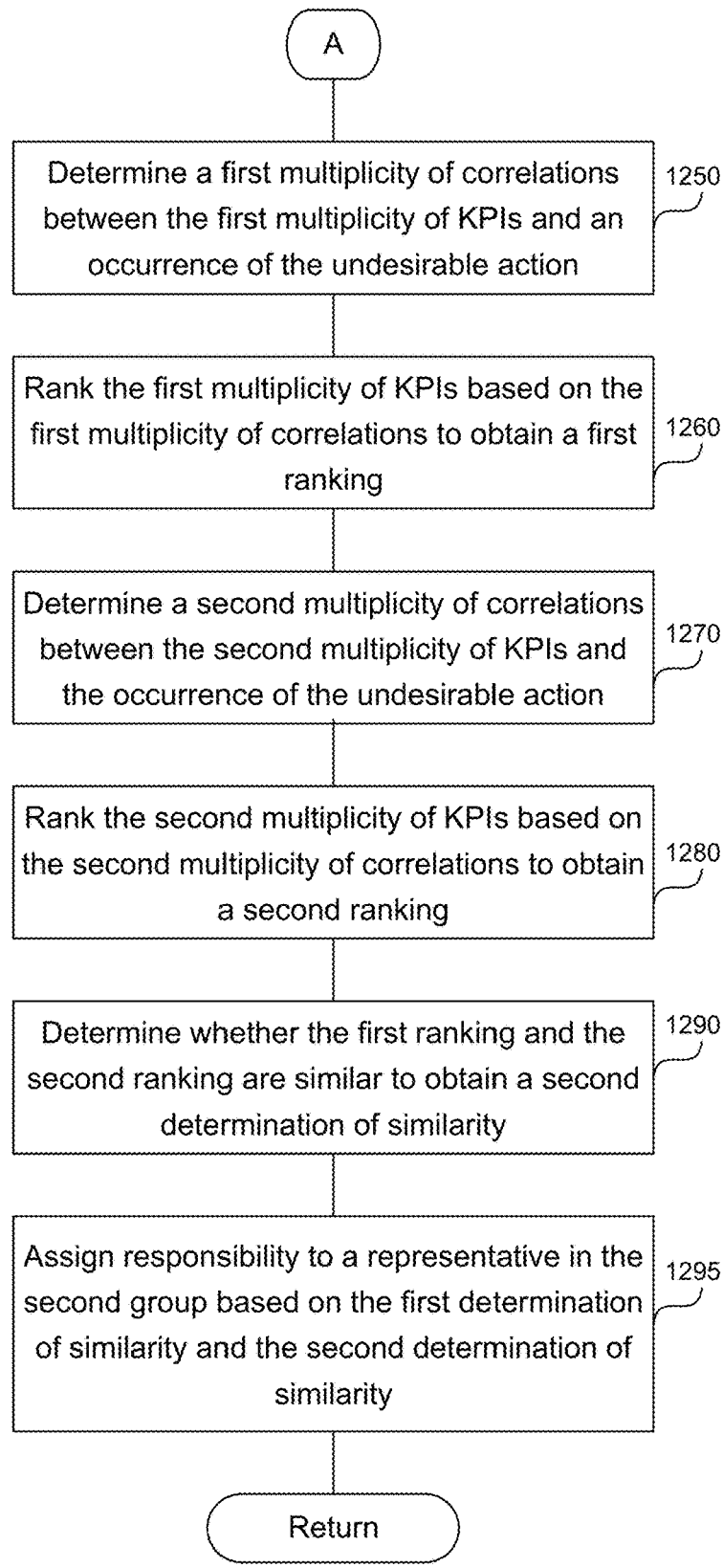

FIGS. 12A-12B show a flowchart of steps that components of the system can perform to determine a responsibility of a representative of a network for a problematic interaction with a UE. In step 1200, a sample extraction module can obtain multiple groups of representatives associated with a wireless telecommunication network, where the multiple groups of representatives can connect to the mobile device. A first group among the multiple groups has a better performance than a second group among the multiple groups.

In step 1210, a distribution analysis module can obtain a first multiplicity of KPIs associated with a first multiplicity of interactions having the undesirable action occurring where the representative associated with the wireless telecommunication network belongs to the first group. In step 1220, the distribution analysis module can obtain a second multiplicity of KPIs associated with a second multiplicity of interactions having the undesirable action occurring where the representative associated with the wireless telecommunication network belongs to the second group.

In step 1230, the distribution analysis module can generate a first distribution of values of a KPI among the first multiplicity of KPIs and a second distribution of values of the KPI among the second multiplicity of KPIs. In step 1240, the distribution analysis module can determine whether the first distribution and the second distribution are similar to obtain a first determination of similarity.

In step 1250, a ranking module can determine a first multiplicity of correlations between the first multiplicity of KPIs and an occurrence of the undesirable action. In step 1260, the ranking module can rank the first multiplicity of KPIs based on the first multiplicity of correlations to obtain a first ranking. In step 1270, the ranking module can determine a second multiplicity of correlations between the second multiplicity of KPIs and the occurrence of the undesirable action.

In step 1280, the ranking module can rank the second multiplicity of KPIs based on the second multiplicity of correlations to obtain a second ranking. In step 1290, the ranking module can determine whether the first ranking and the second ranking are similar to obtain a second determination of similarity.

In step 1295, a responsibility analysis module can assign responsibility to a representative in the second group based on the first determination of similarity and the second determination of similarity.

The responsibility analysis module further can, upon determining that the first distribution and the second distribution are similar, assign a low responsibility value to a representative in the second group. Upon determining that the first distribution and the second distribution are not similar, the responsibility analysis module can assign a high responsibility value to the representative in the second group.

The responsibility analysis module further can, upon determining that the first ranking and the second ranking are similar, assign a low responsibility to a representative in the second group. Upon determining that the first ranking and the second ranking are not similar, the responsibility analysis module can assign a high responsibility to the representative in the second group.

The sample extraction module further can obtain multiple representatives associated with the wireless telecommunication network, a geographic area served by a representative among the multiple representatives, and a skill associated with the representative among the multiple representatives. The sample extraction module can divide the multiple representatives into a first multiplicity of groups based on the geographic area and the skill. The sample extraction module can obtain multiple performances associated with a group of multiple representatives among the first multiplicity of groups. The sample extraction module can divide the group of multiple representatives into the first group and the second group based on the multiple performances, where a first group among the multiple groups is associated with fewer occurrences of the undesirable action than a second group among the multiple groups.

The responsibility analysis module can obtain a first KPI highly correlated to the occurrence of the undesirable action from the first ranking. The responsibility analysis module can obtain a second KPI highly correlated to the occurrence of the undesirable action from the second ranking. The responsibility analysis module can send an indication of the first KPI and the second KPI and a request for an indication of responsibility associated with the first KPI and the second KPI. The responsibility analysis module can receive the indication of responsibility associated with the first KPI and the second KPI. The responsibility analysis module can assign responsibility to a representative from the second group based on the indication of responsibility.

The responsibility analysis module further can, upon determining that the first distribution and the second distribution are similar and that the first ranking and the second ranking are similar, assign a low responsibility to a representative in the second group. Upon determining that the first distribution and the second distribution are not similar and that the first ranking and the second ranking are not similar, the responsibility analysis module can assign a high responsibility to the representative in the second group.

Computer System

Figure 13:
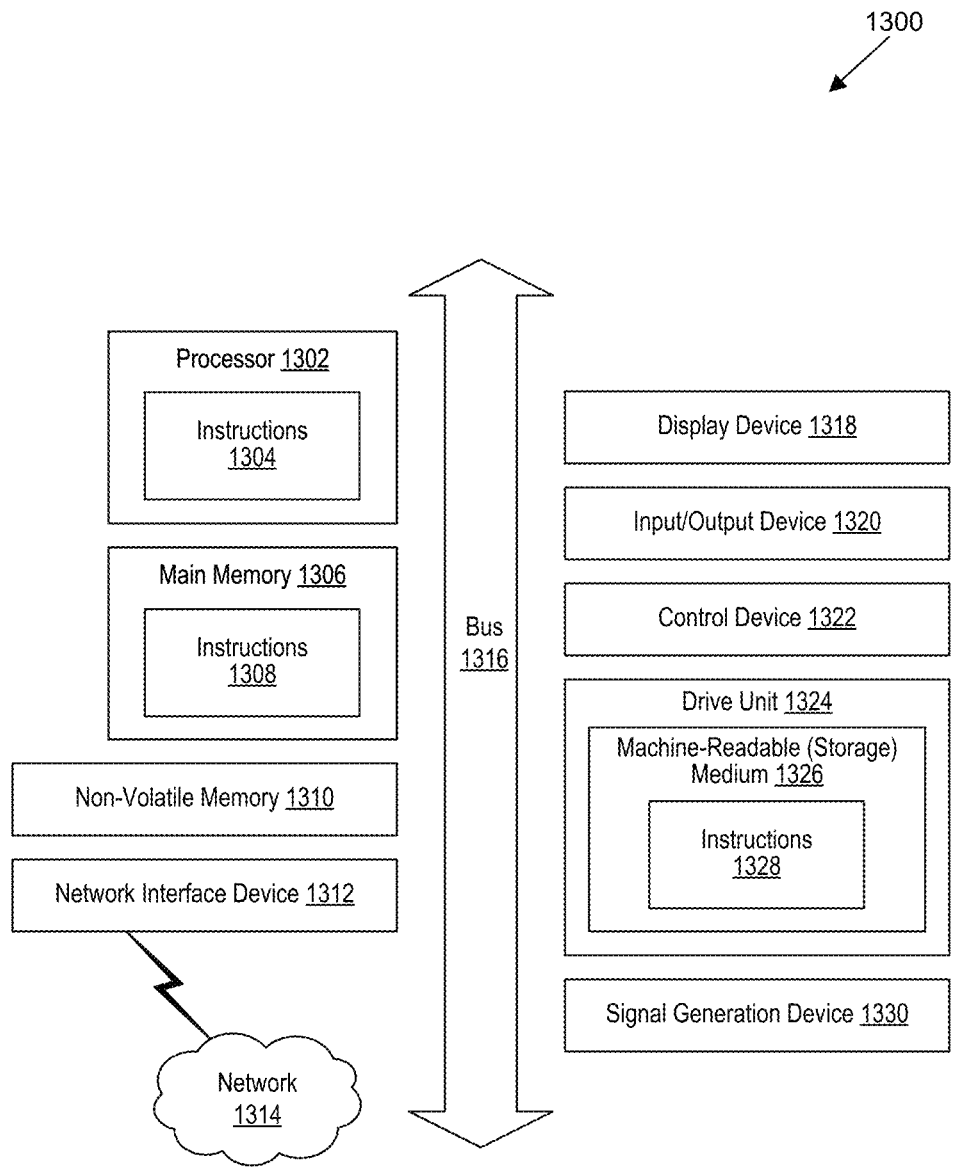
FIG. 13 is a block diagram that illustrates an example of a computer system in which at least some operations described herein can be implemented.

FIG. 13 is a block diagram that illustrates an example of a computer system 1300 in which at least some operations described herein can be implemented. As shown, the computer system 1300 can include: one or more processors 1302, main memory 1306, non-volatile memory 1310, a network interface device 1312, a video display device 1318, an input/output device 1320, a control device 1322 (e.g., keyboard and pointing device), a drive unit 1324 that includes a storage medium 1326, and a signal generation device 1330 that are communicatively connected to a bus 1316. The bus 1316 represents one or more physical buses and/or point-to-point connections that are connected by appropriate bridges, adapters, or controllers. Various common components (e.g., cache memory) are omitted from FIG. 13 for brevity. Instead, the computer system 1300 is intended to illustrate a hardware device on which components illustrated or described relative to the examples of the Figures and any other components described in this specification can be implemented.

The computer system 1300 can take any suitable physical form. For example, the computer system 1300 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computer system 1300. In some implementations, the computer system 1300 can be an embedded computer system, a system-on-chip (SOC), a single-board computer system (SBC), or a distributed system such as a mesh of computer systems, or the computer system 1300 can include one or more cloud components in one or more networks. Where appropriate, one or more computer systems 1300 can perform operations in real-time, near real-time, or in batch mode.

The network interface device 1312 enables the computer system 1300 to mediate data in a network 1314 with an entity that is external to the computer system 1300 through any communication protocol supported by the computer system 1300 and the external entity. Examples of the network interface device 1312 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1306, non-volatile memory 1310, machine-readable medium 1326) can be local, remote, or distributed. Although shown as a single medium, the machine-readable medium 1326 can include multiple media (e.g., a centralized/distributed database and/or associated caches and servers) that store one or more sets of instructions 1328. The machine-readable (storage) medium 1326 can include any medium that is capable of storing, encoding, or carrying a set of instructions for execution by the computer system 1300. The machine-readable medium 1326 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1310, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1304, 1308, 1328) set at various times in various memory and storage devices in computing device(s). When read and executed by the processor 1302, the instruction(s) cause the computer system 1300 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory computer-readable storage medium storing instructions to predict that a mobile device will disassociate from a wireless telecommunication network, which, when executed by at least one data processor of a system, cause the system to:
    obtain a recording of a conversation between a user of the mobile device and a representative of the wireless telecommunication network;
    obtain a summary associated with the conversation,
        wherein the summary includes an indication of a topic associated with a portion of the conversation, a time when the topic was discussed in the conversation, and a speaker associated with the topic,
        wherein the topic is selected from multiple predetermined topics;
    obtain multiple inputs including at least three of:
        a length of time the mobile device has been served by the wireless telecommunication network,
        a length of time the representative has represented the wireless telecommunication network,
        a net promoter score associated with the representative indicating past performance associated with the representative,
        a handle location indicating a geolocation associated with the mobile device;
    provide the summary associated with the conversation and the multiple inputs to a convolutional neural network configured to predict that the mobile device will disassociate from the wireless telecommunication network;
    receive from the convolutional neural network the prediction that the mobile device will disassociate from the wireless telecommunication network;
    determine whether the prediction that the mobile device will disassociate from the wireless telecommunication network is above a predetermined threshold; and
    upon determining that the prediction is above the predetermined threshold, perform an action to retain the mobile device at the wireless telecommunication network.

2. The at least one non-transitory computer-readable storage medium of claim 1, further comprising instructions to:
    obtain multiple recordings of multiple conversations between multiple users of multiple mobile devices and multiple representatives of the wireless telecommunication network, wherein the multiple recordings are text transcriptions of the multiple conversations;
    obtain multiple summaries associated with the multiple conversations;
    obtain multiple inputs associated with the multiple mobile devices and the multiple representatives;
    based on the multiple summaries and the multiple inputs, create multiple images,
        wherein an image among the multiple images represents the summary of a conversation among the multiple conversations and a subset of inputs among the multiple inputs,
            wherein a Y-axis associated with the image represents time during which the conversation occurred,
            wherein a first portion of an X-axis associated with the image represents the multiple predetermined topics,
            wherein a second portion of the X-axis associated with the image represents the speaker associated with the conversation,
            wherein a third portion of the X-axis associated with the image represents an input among the multiple inputs; and
    train the convolutional neural network using the multiple images.

3. The at least one non-transitory computer-readable storage medium of claim 1, further comprising instructions to:
    obtain an indication that the mobile device is disassociating from the wireless telecommunication network;
    obtain multiple conversations between the user associated with the mobile device and the representative associated with the wireless telecommunication network;
    determine multiple predictions that the mobile device will disassociate from the wireless telecommunication network,
        wherein each prediction among the multiple predictions is associated with each conversation among the multiple conversations;
    determine a particular conversation among the multiple conversations having the highest prediction among the multiple predictions; and determine that the particular conversation caused the disassociating from the wireless telecommunication network.

4. The at least one non-transitory computer-readable storage medium of claim 1, wherein the wireless telecommunication network is a 5G wireless telecommunication network, and wherein the instructions to perform the action to retain the mobile device at the wireless telecommunication network further comprise instructions to:
send additional information to the mobile device or offer a monetary incentive to the mobile device.

5. The at least one non-transitory computer-readable storage medium of claim 1, further comprising instructions to:
create an image representing the summary of the conversation and the multiple inputs,
wherein a Y-axis associated with the image represents time during which the conversation occurred,
wherein a first portion of an X-axis associated with the image represents the multiple predetermined topics,
wherein a second portion of the X-axis associated with the image represents the speaker associated with the conversation,
wherein a third portion of the X-axis associated with the image represents an input among the multiple inputs; and
provide the image to the convolutional neural network as an input.

6. A system comprising:
at least one hardware processor; and
at least one non-transitory memory storing instructions, which, when executed by the at least one hardware processor, cause the system to:
obtain a recording of an interaction between a UE and a representative of a wireless telecommunication network;
obtain a summary associated with the interaction,
wherein the summary includes an indication of a topic associated with a portion of the interaction, a time when the topic was present in the interaction, and a generator of the portion of the interaction associated with the topic,
wherein the topic is selected from multiple predetermined topics;
obtain multiple inputs associated with the UE and the representative of the wireless telecommunication network;
provide the summary associated with the interaction and the multiple inputs to an artificial intelligence (AI) configured to predict a prediction of a predetermined action associated with the UE;
receive from the Al the prediction of the predetermined action associated with the UE; and
based on the prediction of the predetermined action associated with the UE, perform an action associated with a wireless telecommunication network prior to an occurrence of the predetermined action associated with the UE.

7. The system of claim 6, comprising instructions to:
obtain a score associated with the representative of the wireless telecommunication network;
obtain a second summary associated with a second interaction between the UE and the wireless telecommunication network, and a second multiplicity of inputs;
train a second Al to receive the second summary associated with the second interaction and the second multiplicity of inputs and produce a second score;
provide the summary associated with the interaction and the multiple inputs to the second Al trained to produce the second score; and
obtain the second score associated with the representative of the wireless telecommunication network from the second Al.

8. The system of claim 6, comprising instructions to:
provide the summary associated with the interaction and the multiple inputs to an artificial intelligence (AI) configured to predict a prediction of a subsequent interaction between the UE and the representative of the wireless telecommunication network;
receive from the Al the prediction of the subsequent interaction between the UE and the representative of the wireless telecommunication network;
determine whether the prediction of the subsequent interaction between the UE and the representative of the wireless telecommunication network is above a predetermined threshold; and
upon determining that the prediction of the subsequent interaction between the UE and the representative of the wireless telecommunication network is above the predetermined threshold, send additional information to the UE prior to the UE initiating the subsequent interaction.

9. The system of claim 6, wherein the predetermined action includes disassociating from the wireless telecommunication network, adding a UE to the wireless telecommunication network, or accepting an offer from the wireless telecommunication network.

10. The system of claim 6, further comprising instructions to:
create an image representing the multiple inputs and the summary associated with the interaction,
wherein a Y-axis associated with the image represents time during which the interaction occurred,
wherein a first portion of an X-axis associated with the image represents the multiple predetermined topics,
wherein a second portion of the X-axis associated with the image represents a generator of the portion of the interaction associated with the interaction,
wherein a third portion of the X-axis associated with the image represents an input among the multiple inputs; and
provide the image to the Al as an input.

11. The system of claim 6, further comprising instructions to:
obtain multiple recordings of multiple interactions between multiple users of multiple UEs and multiple representatives of the wireless telecommunication network;
obtain multiple summaries associated with the multiple interactions;
obtain multiple inputs associated with the multiple UEs and multiple representatives;
based on the multiple summaries and multiple inputs, create multiple images,
wherein an image among the multiple images represents a summary of an interaction among the multiple interactions and a subset of inputs among the multiple inputs,
wherein a Y-axis associated with the image represents time during which the interaction occurred,
wherein a first portion of an X-axis associated with the image represents the multiple predetermined topics, wherein a second portion of the X-axis associated with the image represents a generator of the portion of the interaction associated with the interaction,
wherein a third portion of the X-axis associated with the image represents an input among the multiple inputs; and
train the Al using the multiple images.

12. The system of claim 6, further comprising instructions to:
obtain an indication that the UE is disassociating from the wireless telecommunication network;
obtain multiple interactions between a user associated with the UE and the representative associated with the wireless telecommunication network;
determine multiple predictions that the UE will disassociate from the wireless telecommunication network,
wherein each prediction among the multiple predictions is associated with each interaction among the multiple interactions;
determine a particular interaction among the multiple interactions having the highest prediction among the multiple predictions; and
determine that the particular interaction caused the disassociating from the wireless telecommunication network.

13. The system of claim 6, wherein the instructions to perform the action to retain the UE at the wireless telecommunication network further comprise instructions to:
send additional information to the UE or offer a monetary incentive to the UE.

14. A system to predict an action associated with a UE comprising:
a training module configured to:
obtain multiple records of multiple interactions between multiple users of multiple UEs and multiple representatives of a wireless telecommunication network;
obtain multiple summaries associated with the multiple interactions;
obtain multiple inputs associated with the multiple UEs and multiple representatives;
based on the multiple summaries and multiple inputs, create multiple images,
wherein an image among the multiple images represents a summary of an interaction among the multiple interactions and a subset of inputs among the multiple inputs, p4 wherein a Y-axis associated with the image represents time during which the interaction occurred,
wherein a first portion of an X-axis associated with the image represents multiple predetermined topics,
wherein a second portion of the X-axis associated with the image represents a speaker associated with the interaction,
wherein a third portion of the X-axis associated with the image represents an input among the multiple inputs; and
train an Al using the multiple images;
the Al configured to:
receive a record of an interaction between the UE and a representative of the wireless telecommunication network;
receive a summary associated with the interaction, wherein the summary includes an indication of a topic associated with a portion of the interaction, a time when the topic was discussed in the interaction, and a speaker associated with the topic,
wherein the topic is selected from multiple predetermined topics;
receive multiple inputs associated with the representative and the UE;
generate a prediction of a predetermined action associated with the UE;
at least one hardware processor; and
at least one non-transitory memory storing instructions, which, when executed by the at least one hardware processor, cause the system to:
based on the prediction of the predetermined action associated with the UE, perform an action associated with a wireless telecommunication network prior to an occurrence of the predetermined action associated with the UE.

15. The system of claim 14, wherein the multiple inputs include at least three of:
a length of time the UE has been served by the wireless telecommunication network,
a length of time the representative has represented the wireless telecommunication network,
a net promoter score associated with the representative indicating past performance associated with the representative,
a handle location indicating a geolocation associated with the UE,
a bill change indicating a change to a bill associated with the UE,
a credit class indicating credit history associated with the UE,
a delinquent balance associated with the UE, and
multiple delinquency indicators associated with the UE indicating a prediction of the UE defaulting on a payment associated with the wireless telecommunication network.

16. The system of claim 14, comprising:
the training module configured to:
obtain a net promoter score associated with the representative of the wireless telecommunication network;
obtain a second summary associated with a second interaction between the UE and the wireless telecommunication network, and a second multiplicity of inputs;
train a second Al to receive the second summary associated with the second interaction and the second multiplicity of inputs and produce a second net promoter score;
the Al configured to:
receive the summary associated with the interaction and the multiple inputs; and
provide the second net promoter score associated with the representative of the wireless telecommunication network from the second Al.

17. The system of claim 14, further comprising:
the Al configured to:
receive the summary associated with the interaction and the multiple inputs;
predict a prediction of a subsequent interaction between the UE and the representative of the wireless telecommunication network;
at least one non-transitory memory storing instructions, which, when executed by the at least one hardware processor, cause the system to:

determine whether the prediction of the subsequent interaction between the UE and the representative of the wireless telecommunication network is above a predetermined threshold; and upon determining that the prediction of the subsequent interaction between the UE and the representative of the wireless telecommunication network is above the predetermined threshold, send additional information to the UE prior to the UE initiating the subsequent interaction.

18. The system of claim 14, wherein the predetermined action includes disassociating from the wireless telecommunication network, adding a UE to the wireless telecommunication network, or accepting an offer from the wireless telecommunication network.

19. The system of claim 14, further comprising instructions to:

create an image representing the summary of the interaction and the multiple inputs, wherein a Y-axis associated with the image represents time during which the interaction occurred, wherein a first portion of an X-axis associated with the image represents the multiple predetermined topics, wherein a second portion of the X-axis associated with the image represents the speaker associated with the interaction, wherein a third portion of the X-axis associated with the image represents an input among the multiple inputs; and provide the image to the AI as an input.

20. The system of claim 14, further comprising instructions to:

obtain an indication that the UE is disassociating from the wireless telecommunication network;

obtain multiple interactions between the UE and the representative associated with the wireless telecommunication network;

determine multiple predictions that the UE will disassociate from the wireless telecommunication network, wherein each prediction among the multiple predictions is associated with each interaction among the multiple interactions;

determine a particular interaction among the multiple interactions having the highest prediction among the multiple predictions; and determine that the particular interaction caused the disassociating from the wireless telecommunication network.

* * * * *